United States Patent [19]

Raychaudhuri

[11] Patent Number: 4,688,213
[45] Date of Patent: Aug. 18, 1987

[54] ASYNCHRONOUS RANDOM ACCESS COMMUNICATION SYSTEM WITH COLLISION RESOLUTION BASED ON TIME OF ARRIVAL

[75] Inventor: Dipankar Raychaudhuri, Kendall Park, N.J.

[73] Assignee: RCA Corporation, Princeton, N.J.

[21] Appl. No.: 802,999

[22] Filed: Nov. 29, 1985

[51] Int. Cl.$^4$ .............................................. H04J 3/24
[52] U.S. Cl. ........................................ 370/93; 370/94
[58] Field of Search ..................... 370/94, 93, 85, 104, 370/89, 95; 340/825.5

[56] References Cited

U.S. PATENT DOCUMENTS

| | | | |
|---|---|---|---|
| 4,063,220 | 12/1977 | Metcalfe et al. | 340/147 LP |
| 4,210,780 | 7/1980 | Hopkins et al. | 370/80 |
| 4,234,952 | 11/1980 | Gable et al. | 370/94 |
| 4,320,500 | 3/1982 | Barberis et al. | 370/60 |
| 4,332,027 | 5/1982 | Malcolm et al. | 370/94 |
| 4,337,465 | 6/1982 | Sprackler et al. | 340/825.03 |
| 4,380,761 | 4/1983 | Boggs | 340/825.5 |
| 4,476,467 | 10/1984 | Terwilliger et al. | 340/825.5 |
| 4,514,843 | 4/1985 | Albanese | 370/93 |
| 4,542,502 | 9/1985 | Levinson et al. | 370/88 |
| 4,543,574 | 9/1985 | Takagi et al. | 340/825.5 |
| 4,550,397 | 10/1985 | Turner et al. | 370/60 |
| 4,560,984 | 12/1985 | Scholl | 340/825.5 |
| 4,604,685 | 8/1986 | Brown et al. | 364/200 |

OTHER PUBLICATIONS

Patent Application Ser. No. 610,007 filed May 14, 1984, in the name of Raychaudhuri.

Primary Examiner—Douglas W. Olms
Assistant Examiner—Wellington Chin
Attorney, Agent, or Firm—Joseph S. Tripoli; William H. Meise; Henry I. Steckler

[57] ABSTRACT

An asynchronous random access system includes stations which in one embodiment transmit information as packets at random times. After a path delay, all stations receive the packets. By comparing the period of activity at the station with the known packet length, all stations know when a collision occurs. According to the system protocol, all station inhibit new transmissions for a predetermined time which includes a retransmission time. Stations whose packets were involved in the collision know that their transmission was unsuccessful, and they can also determine whether their own packets were first or last in the collision, based upon the known path delay. Retransmission of the first and last packets occurs during the retransmission interval and is guaranteed to be successful, because all other stations are inhibited. In another embodiment, evaluation of the received data is also performed to establish which packets are second and/or penultimate in collision, and they are also retransmitted according to a prescribed schedule.

35 Claims, 26 Drawing Figures

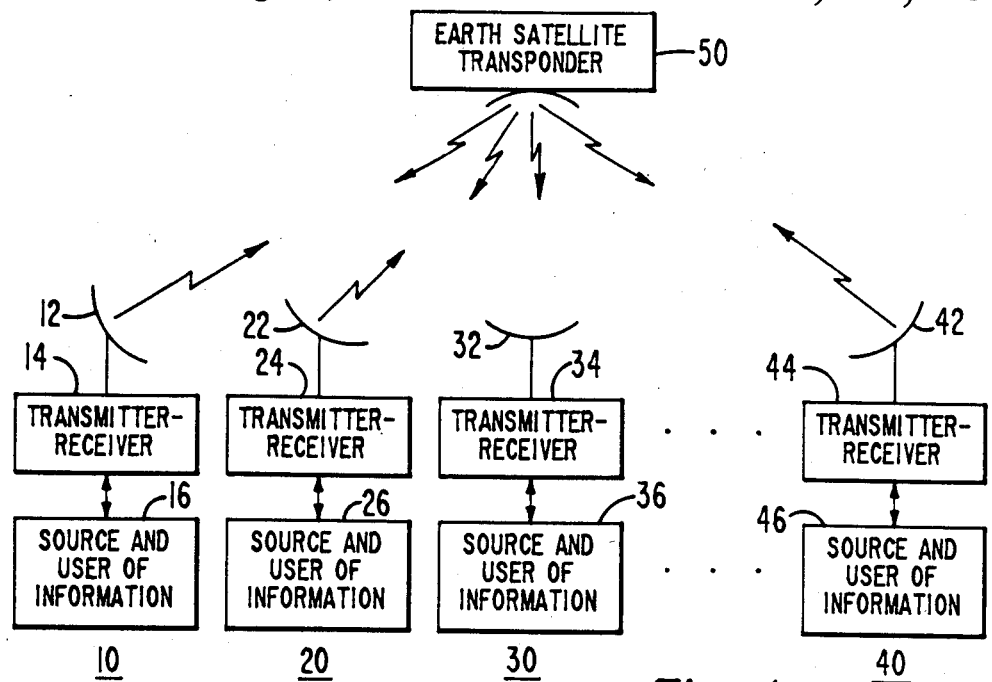
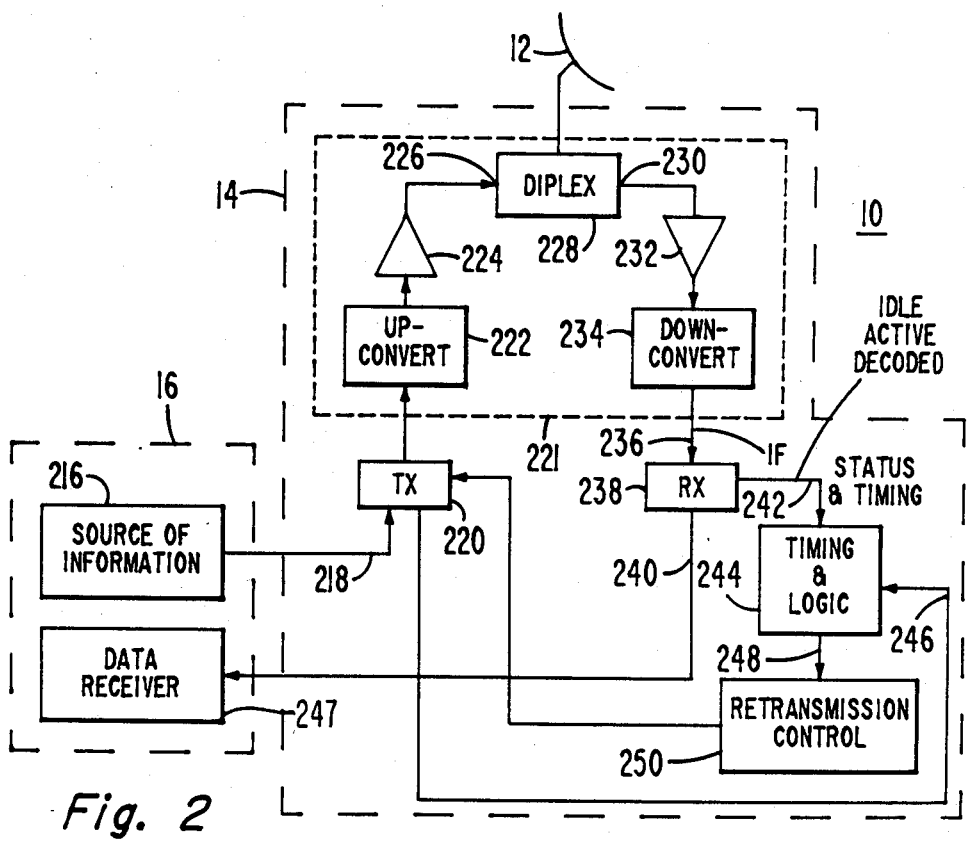
Fig. 1
Fig. 2

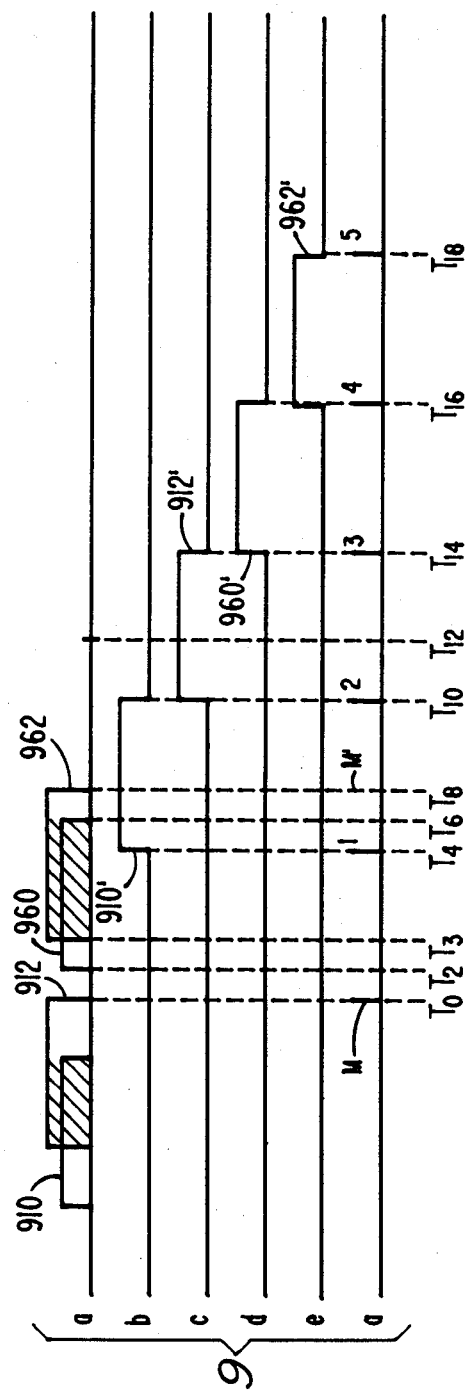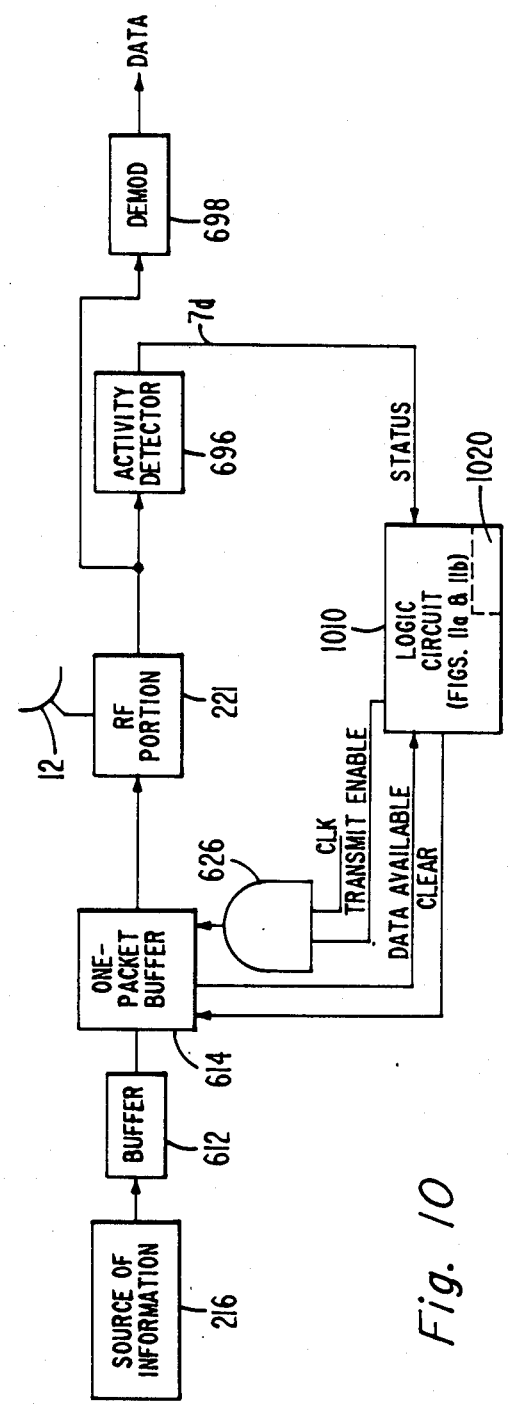
Fig. 9
Fig. 10

CHANNEL STATE EVALUATOR

ASYNCHRONOUS RANDOM ACCESS COMMUNICATION SYSTEM WITH COLLISION RESOLUTION BASED ON TIME OF ARRIVAL

This invention relates to asynchronous, contention type, random access communication systems in which collisions between data packets result in scheduled retransmissions which are not interfered with by original transmissions.

BACKGROUND OF THE INVENTION

Many modern communication systems involve a number of geographically dispersed transmitter-receivers which communicate with each other by way of a high data rate transmission channel. The transmission channel may be a broadcast channel, fiber optic cable or electromagnetic transmission line, or it may include transmissions among a number of Earth station transmitter-receivers by way of the transponder of an Earth satellite. Economic considerations suggest that when the capital cost of a communications system is large, the capacity (the maximum throughput) of the system be as large as possible. Capacity is at a maximum, or 100%, when a single transmitter operates continuously and uses the communication channel or transmission path to address one or more receivers. Such a path or channel is also known as a bus. When more than one transmitter must use the transmission path, a problem arises relating to scheduling the transmitters for maximum system capacity. If the transmitters which are to share the transmission path are physically near each other, a scheduler may be connected to each transmitter to uniquely establish a transmission time for each transmitter depending upon the amount of data to be transmitted, its importance or like considerations. When the geographic distance between the transmitters is large, and there is therefore a time delay between the signals leaving the scheduler and the time at which they arrive at the transmitters to be controlled, the scheduler may not be efficient in adapting to the changing conditions at each transmitter.

One approach to multi access on such high propagation delay channels is to partition the channel time in a fixed, predetermined manner. Such systems are known as time division multiple access (TDMA) systems. They are efficient when the user population includes a few users having high duty cycles. Many modern systems provide communication among interactive data terminals, which operate in low duty cycle burst modes. Time division multiple access is not efficient in this context.

In response to the increasing need for communication over transmission paths having a time delay, schemes have evolved in which each transmitter-receiver (Tx/Rx) monitors the signal on the transmission path to determine whether the transmission path is active or idle, for scheduling transmissions during idle intervals. Because of the path delays, two or more transmitter-receivers might begin transmission at nearly the same time, unaware of each other's transmission. As a result, the transmission path would carry two or more signals simultaneously, causing a mutual interference known as a collision. Such collisions ordinarily make it impossible to correctly receive and decode the information carried by the signals. When the information is destroyed by a collision, it must be retransmitted. Many procedures or protocols have been devised for monitoring the transmission path and for scheduling transmissions and retransmissions to maximize capacity. Carrier sensing systems of this general sort have capacities in the region of 80%. U.S. Pat. No. 4,234,952 issued Nov. 18, 1980, to Gable, for example, stops or truncates the transmission of an information packet when interference is noted during transmission of that packet. Once a transmission has been in progress for the end-to-end propagation time of the transmission path, all transmitters other than the one transmitting are inhibiting and the transmission is completed without collision.

The problems associated with TDMA and carrier sensing systems have led to contention protocols intended to more efficiently utilize a charged high propagation delay transmission path for low duty cycle communications among large number of users. In general, contention systems allow any transmitter-receiver to transmit a message at will. In the event that two transmitter-receivers transmit at overlapping times, a collision occurs, as in the case of the carrier sensing systems with long propagation delays. Each transmitter-receiver must determine the existence of such collisions and respond by retransmitting the information. The ALOHA contention protocol is an asynchronous or unslotted system in which a plurality of remote stations are connected to a central station by a single transmission path. The various remote stations transmit complete packets of data over the transmission path. Collisions are resolved by retransmission at random times after the collision. The ALOHA system has a capacity of approximately 18 percent for low data rate transmissions. Thus, it has a relatively low maximum throughput due to the inefficiency associated with wasting the time of two transmission packets in the event of a slight overlap of packet transmission times.

Slotted or synchronous ALOHA is an improvement over simple ALOHA in which all transmissions occur in fixed non-overlapping time slots. By thus slotting or synchronizing transmissions, the vulnerable time for packet collision is reduced from a duration equal to two packet intervals to one packet interval, and the capacity therefore increases to 37%. The slotting requirement, however, increases the cost and complexity of the system. Also, both slotted and unslotted ALOHA are subject to further inefficiencies resulting from collisions of retransmitted packets.

A contention access protocol in which new transmissions are prevented from interfering with retransmissions provides up to approximately 49% capacity. This system is the Capetanakis tree algorithm, described in IEEE Transactions on Information Theory, September 1979, pp. 505–515, later refined by J. L. Massey and by R. G. Gallager. Tree algorithms achieve high capacity on short propagation delay systems, but are not well suited to long propagation delay systems because the outcome of a slot transmission must be known before transmission on the next slot can begin.

A slotted contention access system entitled "Announced Retransmission Random Access (ARRA)" is described in U.S. patent application, Ser. No. 873,446, filed June 6, 1986, which is a continuation of Ser. No. 610,007, filed May 14, 1984, now abandoned, both filed in the name of the Raychaudhuri. The ARRA system pre-establishes the time at which a retransmission will occur in the event of a collision in a particular packet, and transmits this information together with the original packet in a manner which survives the collision. Thus, all transmitter-receivers are advised of the time at which retransmission will occur, and are programmed to inhibit transmission during that period. The ARRA system provides a capacity of approximately 53% for the less complex embodiments and as high as 60% in the more complex embodiments.

For some applications, the slotting or synchronization requirement of slotted ALOHA, Tree Algorithm Random Access or ARRA may be undesirable. A contention access communication system is desired which is asynchronous and which provides high capacity.

SUMMARY OF THE INVENTION

An asynchronous random access contention system for communicating among a plurality of transmitter-receivers (Tx/Rx) by way of a communication path arranges the information to be transmitted into packets of predetermined duration. Each Tx/Rx initially transmits information at a random time. When the packet returns after a round trip, the Tx/Rx detects the presence or absence of a collision. In the absence of a collision, each Tx/Rx whose original packet was involved in the collision determines if its own packet was first or last, or neither first nor last, and also establishes a time marker at the end of the period of activity in which the collision occurred. All transmitter-receivers note the collision. Those Tx/Rx whose packets where not involved in the collision establish a time marker and inhibit new transmissions during a retransmission interval of predetermined length which follows the time marker. The Tx/Rx whose packet was first or earliest to occur schedules retransmission of the packet during a first portion of the retransmission interval. That transmitter-receiver whose packet was the last involved in the collision schedules retransmission during a second portion of the retransmission interval. Retransmission is therefore collision free. In one embodiment of the invention, a packet involved in a collision which is neither first nor last among the packets so involved reenters the channel asynchronously, similar to new transmissions. In other embodiments of the invention, a packet which is neither first nor last is further resolved as second and/or penultimate, and retransmission is scheduled during third, and if appropriate, fourth portions of the retransmission interval.

DESCRIPTION OF THE DRAWINGS

FIG. 1 is a block diagram of a communications system including a number of Earth stations, each including a transmitter-receiver and an associated source and user of information, each of which transmits to the transponder of an Earth satellite which retransmits received signals to all transmitter-receivers;

FIG. 2 is a general block diagram of one of the Earth stations of FIG. 1;

FIG. 9 is a timing diagram illustrating stacking of retransmissions according to an embodiment of the invention when collisions occur which are closely spaced in time;

FIG. 10 is a block diagram of an Earth station adapted for implementing the protocol illustrated in FIG. 9;

FIG. 17b is a time plot illustrating the operation of the arrangement of FIG. 17a.

DETAILED DESCRIPTION OF THE INVENTION

Figure 3:
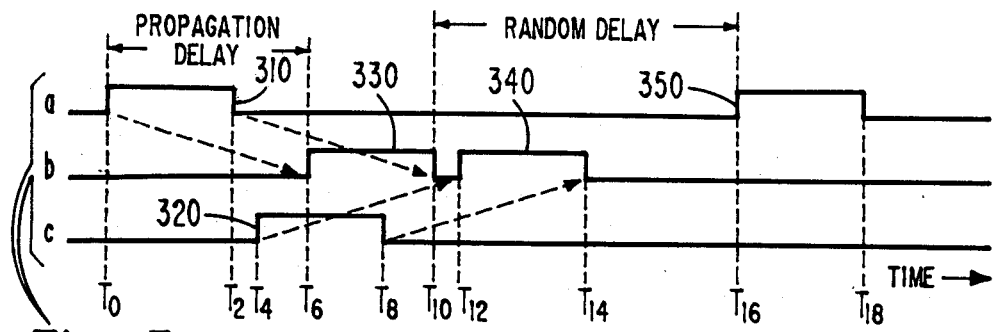
FIG. 3 is a timing diagram illustrating the time delay occurring between transmission by two Earth stations of FIG. 1, and successful reception of the corresponding signals by all transmitter-receivers.

FIG. 1 is a block diagram of a communication system by which a number of Earth stations designated generally as 10, 20, 30 and 40 communicate among themselves by way of a transmission path including a transponder 50 at an Earth satellite. Earth station 10 includes an antenna 12, transmitter-receiver 14, and a source and user of information 16. Block 16 will ordinarily include a computer apparatus which is to communicate with the corresponding computers of other stations. Each of the other Earth stations, designated 20, 30 and 40, includes an antenna 22, 32, 42; a transmitter-receiver 24, 34, 44; and a source and user of information 26, 36, and 46 respectively. All the Earth stations are identical, although each has a unique identifying address for identifying data addressed to it. As illustrated by arrows in FIG. 1, Earth stations 10, 20 and 40 are at the instant shown transmitting towards satellite transponder 50, which receives and retransmits the signals (ordinarily with a frequency translation) for reception by all of the Earth stations of the communications system, including Earth station 30. Transponder 50 is mounted on a satellite which is in a geostationary orbit, which establishes its altitude as 22,400 miles. The round-trip transmission path between a transmitter receiver and any other transmitter-receiver is therefore 44,800 miles. The round-trip time delay for the transmissions is approximately 0.25 second plus any retransmission delay in the transponder. The total delay is substantially greater than the duration of a low duty cycle information burst. Under such conditions, it is not possible for any transmitter-receiver (Tx-Rx) to determine the current status of the sending end of the transmission path. The most current information available to any Tx/Rx relates to a condition which existed about 0.25 seconds earlier. Thus, it is not possible to delay transmission until the sending end is idle as in carrier sensing schemes, nor is it possible to truncate packets in response to a perceived collision.

FIG. 2 is a general block diagram of Earth station 10 of FIG. 1. Elements of FIG. 2 corresponding to those of FIG. 1 are designated by the same reference numeral. In FIG. 2, a source of information 216 supplies information over a conductor 218 to a transmitter (Tx) 220. As known, the information may be in a form of serial data, in which case conductor 218 is a single conductor, or it may be supplied in parallel, in which case conductor 218 is a set including a number of conductors. Since this is well understood in the art, all conductor sets are hereafter described as though they were single conductors. Transmitter 220 receives information from source 216 and encodes the information received from source 216 into a digital format if it is not already in digital form, and adds parity bits or other overhead bits as required for identifying the receiver to which the transmission is directed, and for cyclic redundancy check (CRC) as is well known in the art. Transmitter 220 also forms the information and overhead bits into packets of predetermined duration which are supplied to a radio frequency portion 221. Radio frequency portion 221 includes an upconverter 222 for upconversion to carrier frequency. The carrier frequency signal is applied from upconverter 222 by way of an amplifier 224 to an input terminal 226 of a diplexer 228. Diplexer 228 couples the signals from amplifier 224 to antenna 12 for transmission, and also couples signals received by antenna 12 to a preamplifier 232 of radio frequency portion 221 by way of a terminal 230. As mentioned, the signals received by antenna 12 from transponder 50 (FIG. 1) include packets from other transmitter-receivers at Earth Stations 20, 30 and 40, and also include packets which originated from transmitter 220 of Earth station 10. For purpose of simplicity of nomenclature, a packet returning to the receiver of the Earth station from whose transmitter it originated is termed its "own" packet, and packets received at an Earth station which originated from other Earth stations are termed "other" packets. The preamplified own and other packets from preamplifier 232 are applied to a downconverter 234 which downconverts the signals to an IF frequency and applies them over a conductor 236 to a receiver (RX) 238. Receiver 238 demodulates and buffers the received signals, and applies them over a conductor 240 to a data receiver 246. Receiver 238 may also perform a cyclic redundancy check on the received signal before supplying it to data receiver 246.

Receiver 238 also performs certain other functions associated with the access protocol of the communication system, as described in more detail below. Receiver 238 determines received signal status and generates timing information which is applied over a conductor 242 to a timing and logic circuit illustrated as a block 244. Block 244 also receives from transmitter 220 over a conductor 246 information relating to the time of transmission of each transmitted packet. Timing and logic block 244 processes the time of transmission and arrival to determine the active or idle condition of the receiving end of the transmission path immediately before the leading edge of its own packet arrives, immediately after the lagging edge of its own packet arrives, and also monitors other conditions which may occur during the time in which its own packet is arriving. The result of this signal processing establishes whether or not a collision has occurred, and if a collision has occurred whether its own packet was the first or earliest to occur among those packets involved in the collision, if it was the last to occur among the packets involved in the collision, and other information. This information is applied by way of conductor 248 to a retransmission control block 250 which further processes the information received from block 244 to control further transmission or retransmission of information by transmitter 220. In general, each transmitter accepts a new piece of information from source 216 in response to a successful transmission (reception without collision) of the last packet transmitted, and transmits the new information as a new packet at a random time. In the event of a collision only among other packets (received packets which originate from other transmitter-receivers of the system and do not involve a packet of its own), any transmitter-receiver such as 14 of Earth station 10 inhibits transmission of new packets by transmitter 220 (becomes idle at the transmitting end of the transmission path) for a predetermined interval after the end of activity at the receiving end of the transmission path. At least a portion of this inhibiting interval is a retransmission interval in which other transmitter-receivers whose packets were involved in the collision may retransmit the information which was not successfully transmitted due to the collision. In the event of a collision involving its own packet, transmitter-receiver 14 maintains transmitter 220 idle for one packet duration, and thereafter retransmits the information which was not successfully transmitted due to the collision during one of several packet intervals in the following retransmission interval, according to a pre-established schedule. These retransmissions are guaranteed to be successful because all transmitter-receivers whose packets are not involved in the collision are inhibited from new transmission during the retransmission interval, and because the retransmission protocol avoids conflicts among the retransmitted packets. This protocol therefore achieves a high capacity for asynchronous transmission.

FIGS. 3a–3c are time diagrams illustrating transmissions by Earth stations 10 and 20 of FIG. 1, further illustrating the path delay and the signal received at all Earth stations. In FIG. 3a, a packet 310 represents a period of transmission activity at transmitter-receiver 10 beginning at a time T0 and continuing to a time T2. The interval T0–T2 is the duration of a packet of information. This duration is fixed for all packets in a particular communication system, whether they are original or retransmission packets. FIG. 3c illustrates as a pulse 320 a period of activity at transmitter-receiver 20 as it transmits a packet in the interval T4–T8, which has the same duration as interval T0–T2. FIG. 3b illustrates as 330 and 340 the periods of reception activity at the receivers of Earth stations 10, 20, 30 and 40 of FIG. 1, in response to transmission of packets 310 and 320 by Earth stations 10 and 20, respectively. The leading edge of received packet 330 arrives at all receivers at time T6, later than time T0 at which is was transmitted. The difference between times T0 and T6 is the round-trip propagation delay from antenna 12 (FIG. 1) to transponder 50, and back to any of antennas 12, 22, 32 and 42. Similarly, time T10 at which the lagging edge of packet 330 arrives at the receivers follows time T2 at which it was transmitted by Earth station 10 by a time equal to the propagation delay. The leading and lagging edges of received pulse 340 at times T12 and T14 also follow by the same propagation delay times T4 and T8 at which the leading and lagging edges, respectively, of packet 320 were transmitted. As illustrated in FIGS. 3a, b and c, transmission of packet 320 begins at time T4, after time T2 at which the lagging edge of packet 310 is transmitted, and therefore packets 330 and 340 as received by all receivers do not overlap in time. Earth station 10 is enabled at time T10 for further transmission as a result of successful reception of packet 330, and as illustrated in FIG. 3a, transmits a further packet 350 (which includes new information) beginning at a random time T16 following reception at time T10 of the lagging edge of packet 330. Earth station 20 is enabled at time T14 for further transmission as a result of successful reception of packet 340, but either has no new information to transmit, or randomly selects a time for new transmission which is not illustrated in FIG. 3.

Figure 4:
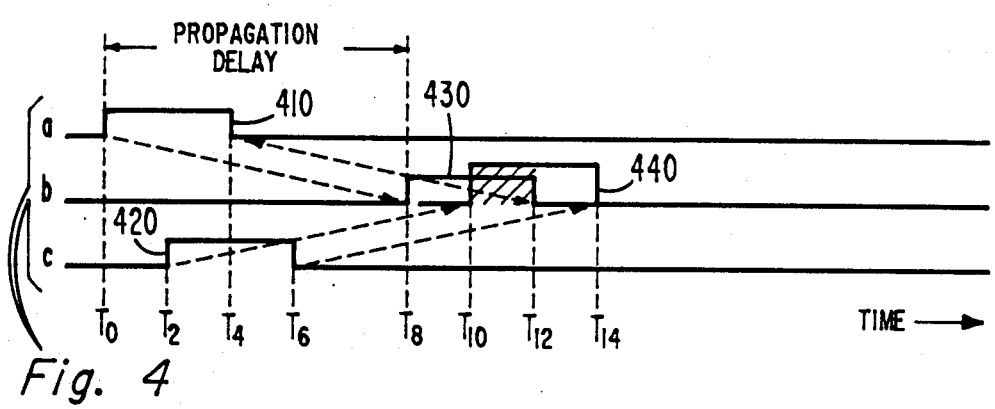
FIG. 4 is a time diagram illustrating partially concurrent transmission of two packets which results in a collision of the signal as received at the receivers.

FIGS. 4a, b and c illustrate the result of transmission of two packets at overlapping times. In FIG. 4a, 410 represents a new packet transmitted by Earth station 10 (FIG. 1) in a randomly selected interval T0-T4. In FIG. 4c, 420 represents a new packet transmitted by Earth station 20 beginning at a randomly selected time T2, before transmission of packet 410 has been completed. The lagging edge of packet 420 is transmitted at time T6. Packet 430 of FIG. 4b represents packet 410 as received by all Earth stations of the system. As illustrated, the leading edge of packet 430 arrives at a time T8 delayed by the system propagation delay from the leading edge of transmitted packet 410. Packet 440 of FIG. 4b represents packet 420 as received, also delayed by the same propagation delay. As illustrated in FIG. 4b, packet 440 is larger in the vertical dimension than packet 430, so that its time of arrival T10 can be seen clearly. The vertical size of the packet has no significance. Packets 430 and 440 arrive together in the interval T10-T12. The interval T10-T12 represents a collision portion of the packets, and is crosshatched in FIG. 4b to represent the loss of the information contained in the packets. When the information in the packet is wholly or partially destroyed, the transmission of information is deemed to be unsuccessful.

Figure 5:
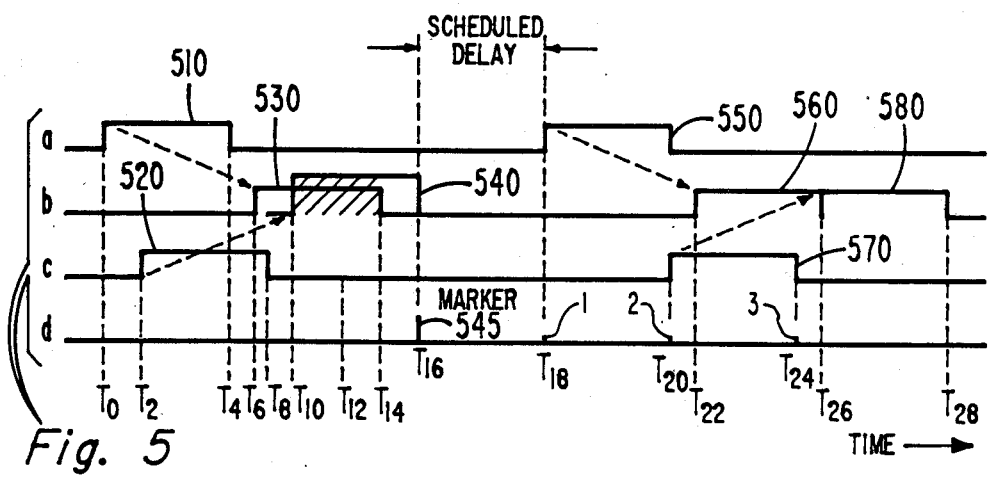
FIG. 5 is a time diagram illustrating the scheduling of retransmission packets in accordance with an embodiment of the invention.

FIG. 5 is a time diagram illustrating scheduled retransmission of packets involved in a collision. In FIG. 5a, pulse 510 represents a packet of information transmitted by Earth station 10 (FIG. 1) beginning at a time T1 and ending at a time T4. Pulse 520 represents a packet transmitted by Earth station 20 beginning at a time T2 and ending at a time T8. At the transmitting end of the transmission path, packets 510 and 520 overlap in the interval T2-T4 (although this cannot be determined until the signals are received), and after a propagation time (which for purposes of illustration is different than the propagation times illustrated in FIGS. 3 and 4) is received by all Earth stations of the system. As illustrated in FIG. 5b, packet 510 as received is represented by a pulse 530 which begins at a time T6 and extends until time T14. Packet 520 as received is illustrated as a pulse 540, which overlaps pulse 530 in the interval T10-T14. As mentioned, such an overlap of the signals as received results in a collision, and the information in the packet is partially or completely lost. According to the invention, each transmitter-receiver monitors the receiving end of the transmission path at its own Earth station to determine whether it own transmitted packet was the first or last involved in the collision. Each transmitter-receiver is programmed with information relating to the round trip propagation time from its transmitter to its receiver by way of the transmission path. This information may be precalculated or based upon experiment. Each transmitter-receiver determines whether the receiving end of the transmission path is active or idle immediately before and after the anticipated or expected time of reception of the leading and lagging edges, respectively, of its packet. For example, transmitter-receiver 14 of Earth station 10 monitors at its receiver to determine whether it receives signals immediately before time T6 (FIG. 5) at which it expects the leading edge of its own packet 530 to be received, and it also monitors the transmission path immediately after time T14 at which the lagging edge of its own packet 530 is expected, to determine if the transmission path is active or idle. As illustrated in FIG. 5b, transmitter-receiver 14 finds that the receiving end of the transmission path is idle immediately before time T6, since no signals are being received. Immediately after the end of reception of its own packet at time T14, however, transmitter-receiver 10 finds that signals are still being received. These signals are from other packet 540 which originated as packet 520 from Earth station 20. With this information, transmitter-receiver 14 can establish with reasonable assurance that its own packet was involved in a collision, since the period of continuous activity on the transmission path as received exceeds one packet duration, and it can also establish that its own received packet 530 was the first or earliest to occur among the packets involved in the collision, because there was no activity on the transmission path prior to the expected time of arrival of its own packet. Transmitter-receiver 14 cannot determine the source of the other packets involved in the collision, nor the number of other packets involved in the collision.

Transmitter-receiver 24 of Earth station 20 also monitors the receiving end of the transmission path, but finds that the transmission path was active immediately before time T10 (the time the leading edge of its own packet 540 returns), and that the transmission path is idle immediately after time T16. From this information, transmitter-receiver 20 also establishes that a collision has occurred. Transmitter-receiver 24, however, determines that its received packet 540 was the last among those involved in the collision, because the transmission path is idle immediately after time T16 at which the lagging edge of its own packet was expected to arrive. All other transmitter-receivers of the system, represented by transmitter-receivers 34 and 44 of FIG. 1, also know that a collision has occurred in the received signals, because the period of continuous activity on the transmission path exceeds the duration of one packet, and also know that their own packets were not involved in the collision, because none of their own packets had scheduled arrival times occurring within interval T6-T16 of FIG. 5.

According to the invention, the transmitter-receivers of the system reschedule transmission of the information contained in original transmitted packets 510 and 520 in a manner which avoids further collision and therefore guarantees successful reception. This is accomplished by a retransmission protocol established for each of the transmitter-receivers which, for transmitter-receivers other than those whose packets are involved in the collision, inhibits initial transmission of new packets for a predetermined time after cessation of activity at the receiver. As described so far, Tx-Rx 14 and 24 have own packets involved in collision, and Tx-Rx 34 and 44 do not have own packets involved in collision. This period without transmissions is an inhibited or idle time. As illustrated in FIG. 5, a period of activity at any receiver ends at a time T16. Each transmitter-receiver produces a time marker such as that conceptually illustrated as 545 at time T16 in FIG. 5d, and counts for a predetermined number of packet durations after the marker. As illustrated in FIG. 5d, a period of one packet duration after time marker 545 expires at time T18, two packet durations after the marker expires at time T20, and three packet durations after the marker expires at time T24. The first packet interval after the time marker, extending from time T16 until time T18, is a time in which new transmissions are inhibited to allow for completion of transmissions which have already started. Such a transmission could occur if a transmitter-receiver of the system other than transmitter-receivers 14 and 24 randomly selected time T12 (FIG. 5) to begin a packet of transmission. Since all packets have the same duration, the transmitted packet (not illustrated in FIG. 5) is guaranteed a time T16-T18 for completion of transmission by idling or preventing new transmissions from any other transmitter-receiver. Beginning at time T18, one packet duration after the time marker at time T16, transmitter-receiver 10 (whose own received packet 530 was first in the collision) begins retransmission of the information originally transmitted in packet 510, as illustrated by packet 550 of FIG. 5a. Since all other transmitter-receivers are required by the system protocol to be idle (not transmit) in the interval T16-T18, packet 550 is received as packet 560 of FIG. 5b by all transmitter-receivers in the interval T22-T26, without interference by other packets. Also in accordance with the system protocol, transmitter-receiver 24, whose received packet 540 was last in collision, retransmits the information contained in originally transmitted packet 520 as a new packet 570 of FIG. 5c beginning at a time T20, two packet durations after the time marker at time T16, and ending at a time T24, three packet durations after time marker 545. Retransmitted packet 570 is received by all the transmitter-receivers of the system beginning at a time T26 and ending at a time T28, as illustrated by packet 580 of FIG. 5b. As illustrated in FIG. 5b, packets 560 and 580 are received consecutively and are not interfered with. Thus, the system protocol provides for asynchronous transmission of new packets at random times, as in the ALOHA system, but schedules at least some of the retransmissions in a conflict-free manner based upon the relative times of arrivals of the colliding packets. After time T24, all Tx-Rx revert to normal operation and transmit new information in the form of packets at randomly selected times.

Figure 6A:
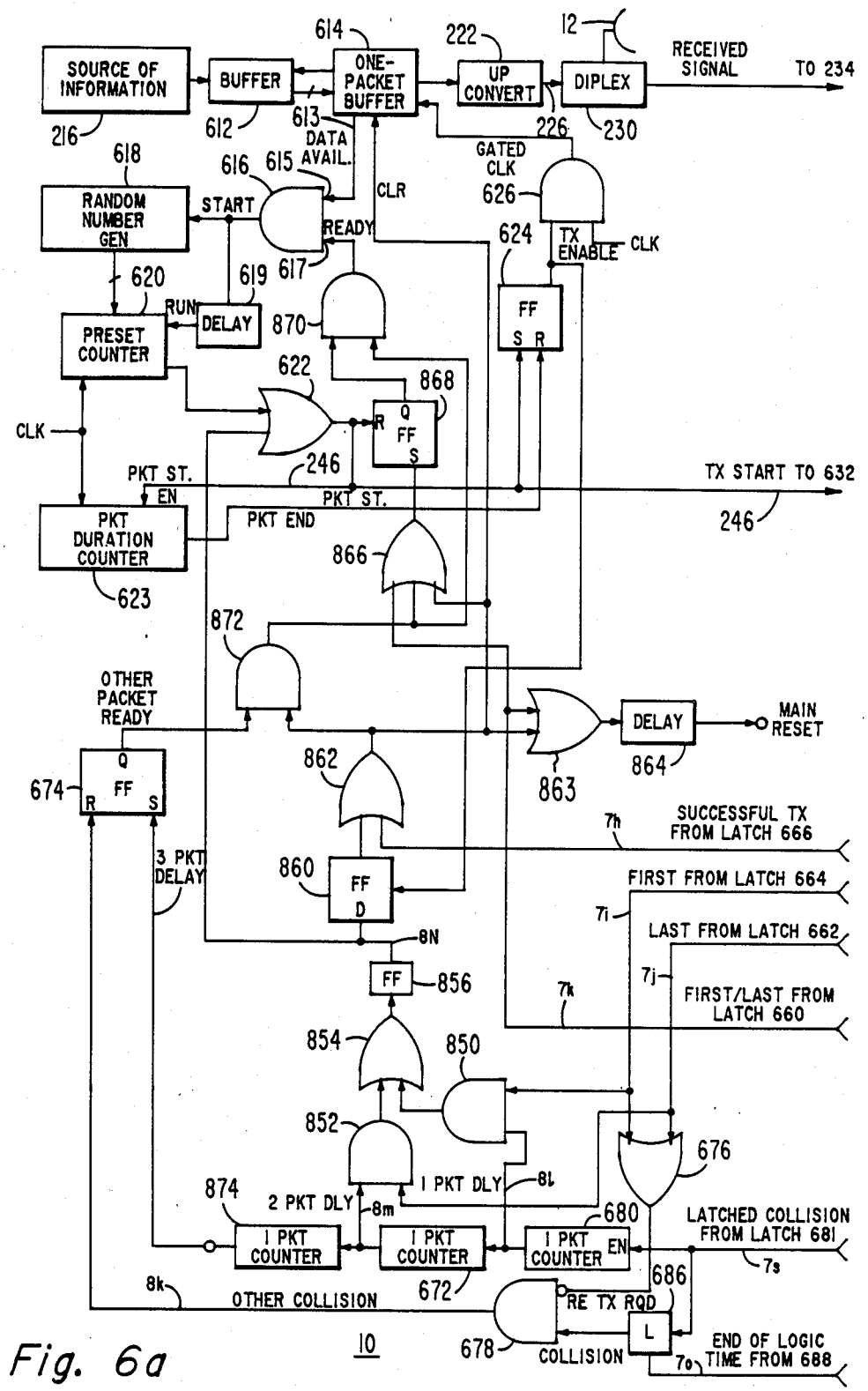
FIGS. 6a and 6b together are a block diagram of a transmitter-receiver adapted for implementing the scheduling as illustrated in FIG. 5 to resolve the first and last packets involved in a collision.
Figure 6B:
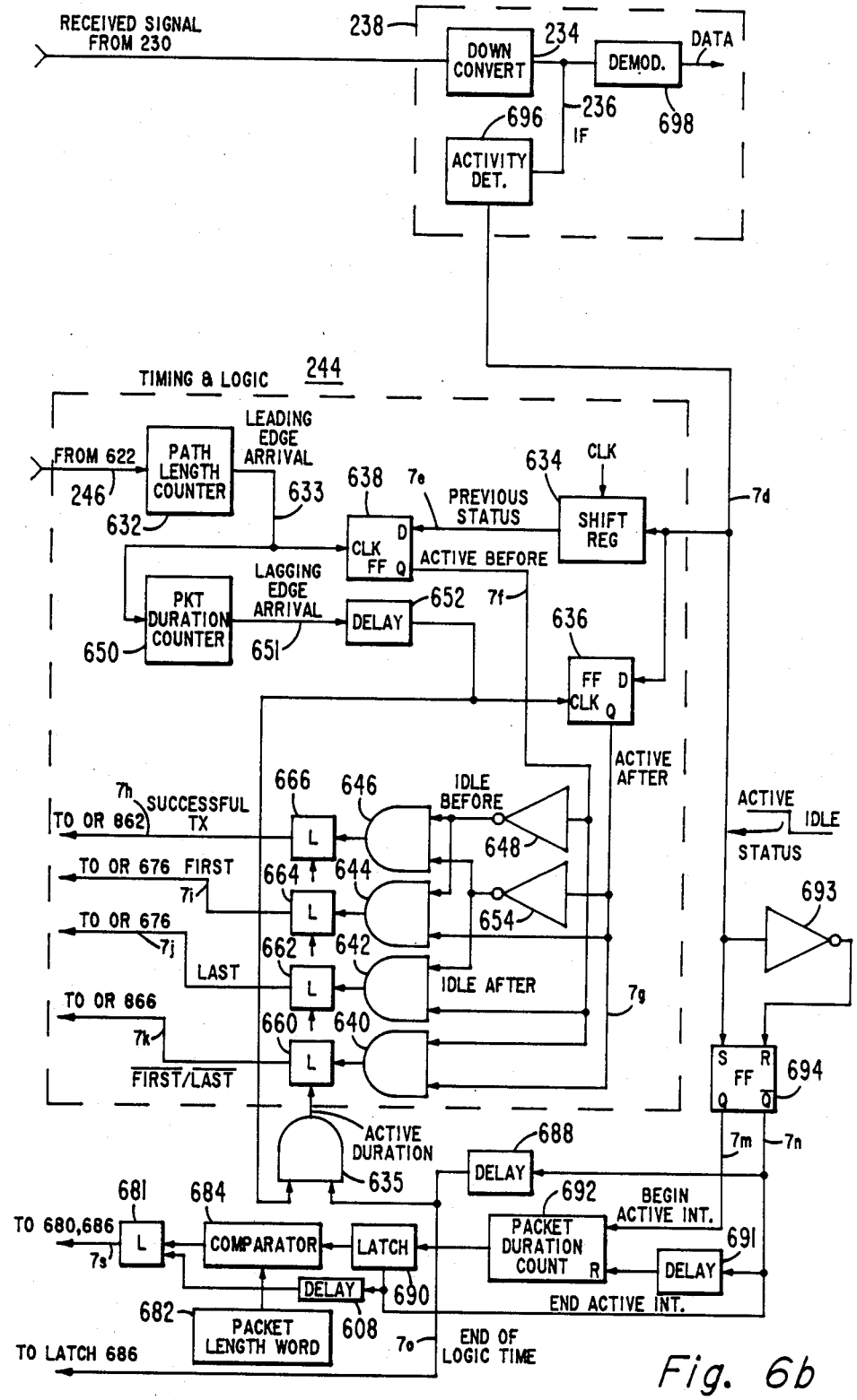

FIGS. 6a and 6b (hereinafter referred to together as FIG. 6) together are a simplified block diagram of those portions of transmitter-receiver 14 of Earth station 10 (FIG. 1) which establish the system access protocol. In FIG. 6, elements corresponding to those of FIGS. 1 and 2 are designated by the same reference numerals. The description of the structure in FIG. 6 is accompanied by a description of the function of the structure under conditions of initial transmission of information as an original packet, and reception of the original packet as the first packet in a collision. The description refers to FIGS. 7 and 8, which are timing diagrams which illustrate the flow of signals and logic for the particular operating condition. Other operating conditions of the arrangement of FIG. 6 are described following the description of the structure.

In FIG. 6a, a source of information 216 produces information to be transmitted which may be in a quantity which requires transmissions which exceed a packet in duration. A buffer 612 receives the information from source 216 as it is produced, and stores it for application to a one-packet information buffer 614, as required. When buffer 614 is full of information to be transmitted, it produces on a conductor 613 a DATA AVAILABLE signal which is supplied to an input terminal 615 of an AND gate 616. Under ordinary circumstances, a READY signal is applied to an input terminal 617 of gate 616, which responds by applying a START signal to an input terminal of a random number generator 618 and, by way of delay 619, applies a RUN signal to start a clocked preset counter 620. The START signal clocks random number generator 618 and produces a new random number which is loaded into preset counter 620. Counter 620 begins to run after the delay established by delay element 619. Counter 620 counts down at the clock rate and, after the preset number of clock cycles, (as established by the preset from random number generator 618), applies a signal to an input terminal of an OR gate 622, which produces a PACKET START signal on a conductor 246, which is connected to the set (S) input of a flip-flop (FF) 624, which produces at its output a TX (transmission) ENABLE signal which is applied, together with the system clock, to an AND gate 626. AND gate 626 produces a GATED CLK (clock) signal which is applied to buffer 614 to clock information from buffer 614 to upconverter 222. The PACKET START signal from OR gate 622 is also applied by way of conductor 246 to enable a packet duration counter 623. After a predetermined duration equal to the desired length of the transmitted packet, counter 623 produces a PKT (packet) END signal which is applied to the reset (R) input terminal of FF624, which resets to thereby end the clocking of buffer 614 and also thereby end transmission of the packet. Upconverter 222 processes the signal clocked from buffer 614 in the interval between setting and resetting of FF624 to produce a packet for transmission, which is applied to an input terminal 226 of diplexer 230. Diplexer 230 couples the signal to be transmitted to antenna 12, from which it is transmitted to the satellite transponder (not illustrated in FIG. 6). The packet so transmitted by transmitter-receiver 10 is illustrated as 702 of FIG. 7a. The leading edge of packet 702 is transmitted at time T0 and the lagging edge at time T4.

Figure 7:
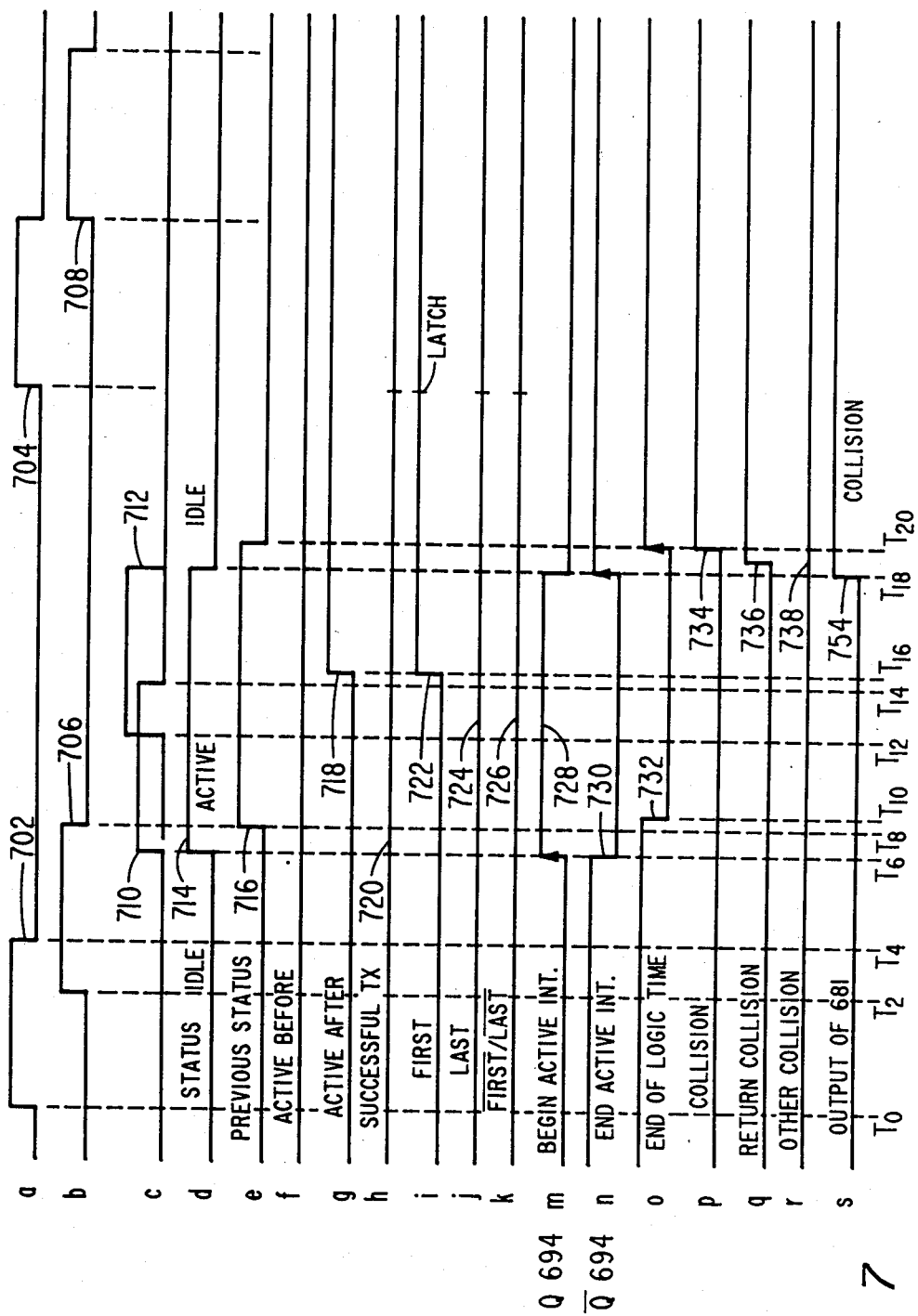
FIG. 7 is a timing diagram illustrating the operation of a part of the arrangement of FIGS. 6a and 6b in a collision situation in which the transmitting transmitter-receiver's own packet is first among those colliding.

The PACKET START signal output of OR gate 622 is also applied by conductor 246 to an input terminal of a path length counter 632 of a timing and logic circuit 244 (FIG. 6b). The PACKET START signal applied from OR gate 622 to path length counter 632 starts counter 632 at the time (T0) of the beginning of transmission of the packet transmitted from antenna 12. Counter 632 counts for a duration of approximately 0.25 second (equal to the path delay), and produces a LEADING EDGE ARRIVAL signal on a conductor 633 at the moment (time T6 as illustrated in FIG. 7) that the leading edge of the transmitted packet is expected to be received. During this counting, another transmitter-receiver such as 20 (FIG. 1) transmits a packet illustrated as 706 in FIG. 7b. Packet 706 is transmitted beginning at time T2 and ending at time T8. The received packets (710 and 712 of FIG. 7c, corresponding to transmitter-receiver 14's own transmitted packet 702 and other packet 706, respectively) arrive at antenna 12 and are coupled through diplexer 230 to downconverter 234 (FIG. 6b) to produce an IF signal on conductor 236 for application to a demodulator 698 and to an activity detector 696. The leading edge of packet 710 arrives at a time T6, and the lagging edge at time T14. The leading edge of packet 712 arrives at time T12 and the lagging edge at time T18. They overlap in the interval T12-T14. Demodulator 698 demodulates the received signal to produce digital data, and performs CRC or parity checks and possibly address identification, and couples the data to a data receiver (not illustrated in FIG. 6). Activity detector 696 establishes the status of the downconverted received signals on conductor 236. Detector 696 may be as simple as a diode carrier detector which produces on a conductor 7d a bi-level STATUS signal 714 having a logic HIGH state representing an active transmission path and a logic LOW state representing an idle transmission path. Such detectors are well-known and a detailed description is omitted. Signal 714 of FIG. 7d represents the STATUS signal for the condition of reception illustrated in FIG. 7c; before time T6 and after time T18 no packets are received, and the STATUS signal is logic LOW, whereas in the interval T6-T18 packets are received in a continuous stream, and the STATUS signal is logic HIGH in that interval. The STATUS signal on conductor 7d is applied to the set (S) input of a FF 694 and, by way of inverter 693, to its reset (R) input. The STATUS signal on conductor 7d is also applied to the input of a shift register 634 and to the data (D) input terminal of a FF 636 of timing and logic circuit 244.

Timing and logic circuit 244 processes the LEADING EDGE ARRIVAL signal on conductor 633 from path length counter 632 together with the STATUS signal on conductor 7d to determine if a returned packet (its own packet) represents a successful transmission, (i.e. one not involved in a collision) or, in the event of a collision, if its own packet was first, last, or neither first nor last. Shift register 634 is continuously clocked, so that its output signal on conductor 7e is a PREVIOUS STATUS signal which represents the STATUS signal immediately (one or more clock cycles, depending upon the length of the shift register) before the leading edge of its own returned packet arrives. As illustrated in FIG. 7e, the PREVIOUS STATUS signal 716 goes logic HIGH at a time T8 delayed from time T6 at which STATUS signal 714 goes HIGH, and similarly its lagging edge occurs at a time T20 later than time T18 at which the lagging edge of the HIGH level of the STATUS signal occurs. Thus, just after time T6 at which the LEADING EDGE ARRIVAL signal on conductor 633 predicts the arrival of its own packet, the PREVIOUS STATUS signal represents the status just before time T6. The PREVIOUS STATUS signal 716 on conductor 7e is applied to the D input terminal of a D-type FF 638, which is clocked at time T6 by the LEADING EDGE ARRIVAL signal on conductor 633 to produce an ACTIVE BEFORE signal at its Q output and on conductor 7f, which represents the PREVIOUS STATUS signal at the instant the leading edge of transmitted packet 702 is expected to return as its own received packet 710. As illustrated in FIG. 7f, the ACTIVE BEFORE signal remains at a logic LOW level, representing the fact that at a time immediately before the leading edge of its own returned packet 710 arrives, the receiving end of the transmission path happens to be idle or inactive. The ACTIVE BEFORE signal from FF 638 is applied over conductor 7f to input terminals of AND gates 640 and 642, and by way of an inverter 648 (which inverts the ACTIVE BEFORE signal to generate an IDLE BEFORE signal) to input terminals of AND gates 644 and 646.

Figure 8:
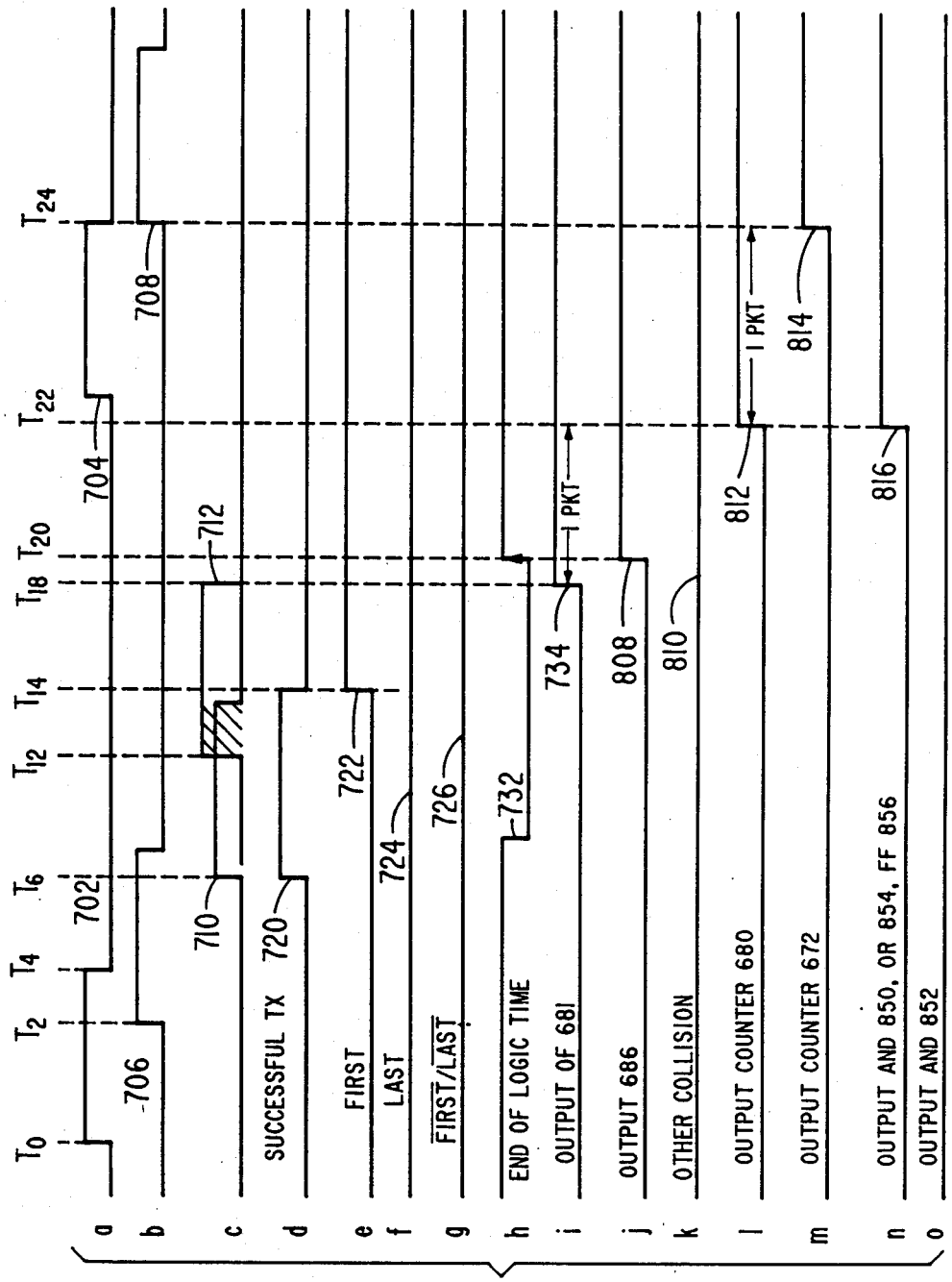
FIG. 8 is a further timing diagram illustrating the operation of the arrangement of FIGS. 6a and 6b.

The LEADING EDGE ARRIVAL signal on conductor 633 is applied to an enable input terminal of a packet duration counter 650, which responds by counting for the duration of one packet to produce a LAGGING EDGE ARRIVAL signal which is applied over a conductor 651 and by way of a short delay block 652 to the clock (CLK) input terminal of FF 636 to couple the STATUS signal applied at its D input terminal to its Q output terminal. The delay imparted by block 652 clocks FF 636 at a time T16 immediately after receipt of the lagging edge of packet 710 at time T14. The STATUS signal as coupled to the Q output of FF 636 is an ACTIVE AFTER signal, which is coupled by way of a conductor 7g to input terminals of AND gates 640 and 644, and by way of an inverter 654 (which inverts the ACTIVE AFTER signal to generate an IDLE AFTER signal), to input terminals of AND gates 642 and 646. The output of AND gate 646 is a SUCCESSFUL TX (transmission) signal, derived from IDLE BEFORE (i.e. $\overline{\text{ACTIVE BEFORE}}$) signal and IDLE AFTER (i.e. $\overline{\text{ACTIVE AFTER}}$) which is latched and applied to a conductor 7h by a latch 666. As illustrated in FIG. 7h, the SUCCESSFUL TX signal 720 remains at a logic LOW level for the reception condition (first in collision) which FIGS. 7 and 8 represent. The SUCCESSFUL TX signal is latched by a latch 666 at a time after the transmission path once again becomes idle, and is applied to conductor 7h. The output of AND gate 644 is a FIRST signal, derived from the IDLE BEFORE (i.e. ACTIVE BEFORE) and ACTIVE AFTER signals, and when logic HIGH represents the fact that the receiving end of the transmission path as illustrated in FIG. 7c is idle immediately before time T6 at which the leading edge of packet 710 is received. It should be remembered that packet 710 is transmitter-receiver 10's own packet, whereas packet 712 originated elsewhere. The FIRST signal 722 is latched by a latch 664 at time T20 and applied to conductor 7i. The output of AND gate 642 is a LAST signal, derived from the IDLE AFTER and the ACTIVE BEFORE signals, and when logic HIGH represents a condition which would occur if received packet 710 of FIG. 7c were received later than packet 712, rather than earlier. The LAST signal is latched by a latch 662 and applied to conductor 7j. AND gate 640 produces a $\overline{\text{FIRST/LAST}}$ signal in response to the $\overline{\text{ACTIVE BEFORE}}$ and ACTIVE AFTER signals, which can both be logic HIGH only if there are three or more packets involved in a collision, and its own returned packet is "neither first nor last". The $\overline{\text{FIRST/LAST}}$ signal is latched by a latch 660 and applied to a conductor 7k.

The outputs of AND gates 640–646 are latched as described by latches 660–666 at a predetermined time after the end of the period of continuous activity on the transmission path. The SUCCESSFUL TX, FIRST, LAST, and FIRST/LAST signals so latched are used for further processing in accordance with the system protocol to establish if and when a further transmission will occur from transmitter-receiver 14. Latches 660–666 are enabled by the output of an AND gate 635 which responds in part to a delayed LAGGING EDGE ARRIVAL signal from delay 652, so latches 660–666 do not latch in the absence of a transmitted packet.

The STATUS signal on conductor 7d sets FF 694 at the beginning of each interval of activity at the receiver (time T6 as illustrated in FIG. 7), thereby setting its Q output and conductor 7m to a logic HIGH level, the rising leading edge of which represents the beginning of the active interval, as illustrated by 728 of FIG. 7m at time T6. The leading edge of signal 728 enables a packet duration counter 692, which begins at time T6 to count clock intervals. When the active interval ends, the STATUS signal drops to a logic LOW level, which transition is applied inverted to the R input terminal of FF 694 to reset FF 694 to produce at its $\bar{Q}$ output and on conductor 7n a logic HIGH level, the rising edge of which represents the time of actual end of the active interval, as illustrated by 730 of FIG. 7n at time T18. Time T18 is the time marker from which later retransmissions are timed. Signal 730 is applied from the $\bar{Q}$ output of FF694 to enable latch 690 and, by way of short delay elements 608 and 691, to a further latch 681 and to the reset (R) input terminal of counter 692 to stop the counting. Thus, at the end of the active interval T6–T18, latch 690 latches the output of counter 692 to produce an output signal which is a digital representation of the duration of the active interval just ended. The $\bar{Q}$ output terminal of FF 694 is also applied to a delay element 688, which has the delay equal to that of delay element 652, to produce on a conductor 7o the END OF LOGIC TIME timing signal illustrated as 732 of FIG. 7o, the lagging edge of which (at time T20) represents a time at which timing and logic circuit 244 has produced its decisions. Signal 732 is applied from delay 688 to latches 660–666 to latch the SUCCESSFUL TX, FIRST, LAST, and FIRST/LAST signals, and is also applied by conductor 7o to enable a further latch 686 (FIG. 6a). As mentioned, at time T18 (the end of active interval), latch 690 latches a digital signal representing the duration of the immediately preceding period of continuous activity at the receiver. This digital signal is applied from latch 690 to a digital comparator 684, which also receives from a packet length word register 682 a fixed digital word representing the standard duration of a signal packet.

Comparator 684 compares the digital signal representative of the duration of the active interval as latched by latch 690 with the fixed digital word from packet length word register 682. If the active duration word equals the packet length word, comparator 684 produces a logic LOW level, and if the active duration exceeds the predetermined packet length, comparator 684 produces a logic HIGH level. A LOW level indicates no collision, and a HIGH level represents a collision. It should be noted that generation of a latched signal in no way depends upon previous transmission of a packet by transmitter-receiver 10; the presence or absence of a collision is established by comparator 684 solely based upon the duration of a preceding period of reception activity. Latch 681 latches the output of comparator 684 at a time near the end of the active interval, as illustrated by waveform 734 of FIG. 7s. In the event of a collision, signal 734 takes a positive-going excursion, as illustrated at time T18, which is coupled by a conductor 7s to the enable input terminal of a one-packet duration counter 680 (FIG. 6a) and to a further latch 686 which latches the signal at time T20 as illustrated by 808 of FIG. 8i. Certain waveforms of FIG. 7 are repeated in FIGS. 8a through 8i for reference, and are designated by the same reference numbers. Signal 808 (FIG. 8i) is applied to a non-inverting input of an AND gate 678. Also applied to an inverting input of gate 678 is a retransmission required (RETXRQD) signal from an OR gate 676, which inhibits the output of AND gate 678 if the collision represented by signal 808 is one involving a packet originating with transmitter-receiver 10 for which a retransmission is required. Thus, the output of AND gate 678, which is applied to the R input of a FF674 by way of a conductor 8k, represents a collision in which its own packet is neither first or last, which may include a collision in which its own packet is not involved.

FIRST signal 722 on conductor 7i and LAST signal 724 on conductor 7j are applied to input terminals of AND gates 850 and 852 (FIG. 6a), respectively, together with one-packet-delayed (1 PKT DLY) signal 812 (FIG. 8l) applied over conductor 8l and two-packet-delayed (2 PKT DLY) signal 814 (FIG. 8m) applied over conductor 8m, respectively. Consequently, when its own packet is first in collision, a FIRST signal is gated by AND gate 850 of Tx/Rx 14 to produce a signal beginning at a time T22, one packet duration after the end of reception activity on the channel, which is coupled through an OR gate 854 to trigger a FF 856. Similarly, if its own packet were last, the LAST signal applied over conductor 7j to AND gate 852 would be gated through OR gate 854 and to FF856 beginning at time T24, two packet durations after the end of reception activity. Thus, FF 856 produces on conductor 8n a pulse such as 816 of FIG. 8n. Signal 816 on conductor 8n is applied to an input of OR gate 622 and is coupled to PACKET START conductor 246, from which it sets FF624 to begin transmission once again of the information stored in (and not cleared from) one-packet buffer 614, and from which it also triggers packet duration counter 623. Signal 816 is further coupled over conductor 246 to start path length counter 632. Thus, the information not successfully transmitted due to a collision is retransmitted according to a schedule, beginning one or two packet durations after the end of reception activity. Signal 816 on conductor 8n is also coupled to the D input of a D-type flip-flop 860, the clock input of which is driven at the moment of the end of retransmission of the packet by the output of FF624, to couple to an OR gate 862 a CLEAR (CLR) signal which is applied by a conductor 865 to buffer 614 to clear the buffer and to initiate loading of new information in readiness for the next transmission. OR gate 862 also receives a SUCCESSFUL TX signal input from conductor 7h in the event of a successful transmission, also for clearing buffer 614. The output of OR gate 862 is further applied by way of a further OR gate 863 and a delay block 864 to reset counters and latches in readiness for the next transmission. The output of OR gate 862 is further applied to an input terminal of a further OR gate 866, the output of which is coupled to the S input of a FF 868. The output of FF 868 is applied to an AND gate 870 to inhibit initiation of a random number selection. Flip-flop 868 is reset by the PACKET START signal on conductor 246, and its output inhibits AND gate 870 until it is once again set at a later time. Flip-flop 868 is set by OR gate 866 in response to the FIRST/LAST signal from conductor 7k (i.e. if an own packet collision has occurred, but no retransmission is scheduled because the relative time of arrival of the own packet cannot be determined), or in response to the output of OR gate 862, which in turn responds to either the SUCCESSFUL TX signal from conductor 7h or to the output of FF 860, which represents initiation of retransmission in response to a FIRST or LAST signal from conductors 7i or 7j, respectively. Thus, after completion of transmission of a retransmission packet, FF 868 is set by FF 860 by way of OR gate 862. Similarly, after a successful transmission, FF 868 is set by the SUCCESSFUL TX signal 720 on conductor 7h by way of OR gates 862 and 866. Still further, FF 868 is set by the FIRST/LAST signal 726 on conductor 7k by way of OR gate 866. Thus, a collision in which its own packet was neither first nor last sets FF868 to enable AND gate 870 for producing a READY signal to start random number generator 816. However, the READY signal is not generated until AND gate 870 receives a signal from AND gate 872. Gate 872 produces an output signal in response to a signal from OR gate 862 in response to a successful transmission and also in response to completion of a retransmission. If the last transmission was not successful due to a collision, and its own packet is neither first nor last, FF 674 is set 3 packet durations after the end of the active interval, AND gate 872 responds by producing an output to enable gate 870 and (by way of OR gate 866) to set FF868, which in turn enables gate 870 to generate a READY signal. The READY signal is gated through AND gate 616, since buffer 614 has not been cleared and therefore applies a DATA AVAILABLE signal to input terminal 615 of gate 616. Thus, an unsuccessful transmission in which its own packet was neither first nor last results in triggering random number generator 618 and preset counter 620 at a time 3 packet durations after the end of the active interval, and they then randomly select a new time for retransmission.

In operation, when transmitter-receiver 14 of FIG. 6 receives signals from other Earth stations which are not involved in a packet collision, the received signals are coupled from antenna 12 through diplexer 230 to downconverter 234 and are demodulated by demodulator 698. The demodulated data is supplied to a user (not illustrated), and activity detector 696 produces a STATUS signal on conductor 7d having a duration equal to the predetermined packet duration, whereby packet duration counter 692 produces a signal which is latched by latch 690. Comparator 684 determines that the latched signal is of the correct duration, and produces a signal on conductor 7s which has no effect on the operation of the transmitter portion of the arrangement of FIG. 6. Thus, successful transmission of an other packet leaves Tx-Rx 14 enabled for transmission of new packets at random times.

When signals are received from other transmitter-receivers, and comparator 684 determines that the active duration exceeds one packet length (and therefore there has been a collision), a signal is latched onto conductor 7s and is further latched to AND gate 678. Under this condition no own packet is expected, so no signal is supplied to the inverting input terminal of AND gate 678 from OR gate 676, and gate 678 is therefore not inhibited, and produces an OTHER COLLISION signal on conductor 8k, which resets FF 674, thereby inhibiting AND gates 872 and 870, thereby preventing a READY signal from being applied to AND gate 616. This prevents the starting of random number generator 618. Three packets later, counter 874 sets FF 674, thereby enabling AND gates 872, 870 and 616 to enable transmitter-receiver 10 for transmission of new information.

In another mode of operation involving successful transmission of its own packet, new information appearing in buffer 614 causes a DATA AVAILABLE signal to be applied to input terminal 615 of AND gate 616, thereby starting the random number generator 618 (in the presence of a READY signal applied to input terminal 617 of AND gate 616). After a random time, counter 620 produces a PACKET START signal on conductor 246 by way of OR gate 622, which starts duration counter 623, sets FF 624 to begin transmission of the data in buffer 614, starts path length counter 632, and resets FF868 to disable AND gates 616 and 870 to prevent further transmissions until the packet is received. The returned own packet is received, downconverted and processed by activity detector 696, to produce on conductor 695 a STATUS signal which operates packet duration counter 692, as described above. Packet duration counter 692 counts for one packet duration, and comparator 684 therefore does not produce a COLLISION signal. The STATUS signal on conductor 695 is analyzed by TIMING and LOGIC 244 to produce one of a SUCCESSFUL TX, FIRST, LAST, or FIRST-/LAST signal on conductors 7h-7k, respectively. The SUCCESSFUL TX signal on conductor 7h clears buffer 614 to begin reloading new information, and enables AND gate 872 and begins system resetting, all by way of OR gate 862. With AND gate 872 enabled, and with FF674 remaining in its set condition (due to lack of a COLLISION signal), transmitter-receiver 10 is immediately enabled for transmission of new information at a random time.

On the other hand, after transmission of a packet, a collision may occur. Counter 692 and comparator 684 produce a COLLISION signal on conductor 7s. This is not coupled to reset FF 674, because OR gate 676 inhibits AND gate 678. Timing and logic circuit 244 establishes that the received packet was first or last in collision by signals on one of conductors 7i and 7j, which are gated by AND gates 850 and 852, respectively, one or two packets after the end of activity to produce a pulse on conductor 8n (by way of OR gate 854 and FF 856). The pulse on conductor 8n does not immediately clear buffer 614, but is coupled through OR gate 622 to produce a PACKET START signal on conductor 246 which causes retransmission of the information in buffer 614. The signal on conductor 8n is clocked through FF 860 at the completion of retransmission, clears buffer 614 and initiates resetting in readiness for a new transmission of new information.

In a final mode of operation of the arrangement of FIG. 6, after transmission and reception of an own packet involved in a collision, timing and logic circuit 244 may determine that its own packet was not the first or the last by producing a FIRST/LAST signal on conductor 7k, which is coupled by way of OR gate 866 to set FF 868 to aid in restoring a READY condition, without clearing buffer 614. However, the READY condition is not achieved until 3 packet durations later, because AND 678 is not inhibited, and resets FF 674 in response to the COLLISION signal. As mentioned, FF 674 is set after 3 packets by count 874. This allows random number generator 618 to be clocked. Thus, at a random time which is selected 3 packet durations after cessation of reception activity, the information stored in buffer 614 is retransmitted.

Due to the random nature of the initial transmissions, a situation may arise in which successive sets of colliding transmissions are made in which scheduled retransmission of the identifiable or resolvable packets of the second collision cannot begin immediately, because retransmission of the identified packets of the first collision set has not been completed. This situation is illustrated in FIG. 9. In FIG. 9*a*, colliding packets 910 and 912 have been received by a time T0. In accordance with the retransmission protocol as so far described, all receivers set a time marker (illustrated as M in FIG. 9*f*) at time T0. According to the protocol, all transmitter-receivers remain inhibited as to initiation of new transmissions for one packet duration until a time illustrated as T4. As illustrated in FIG. 9*a*, a further packet 960 is received beginning at a time T2. At time T4, one packet duration after the time marker M, retransmission of the information contained in packet 910 begins according to the protocol, as illustrated by 910' of FIG. 9*b*. A second packet 962 colliding with packet 960 is received beginning at a time T3, as illustrated in FIG. 9*a*. The last portion of the active interval of this second set of colliding packets occurs at a time T8. According to the basic protocol as so far described, time T8 should also be a time marker from which retransmissions are timed. Retransmission of packet 910' ends at time T10, two packet durations after time marker M. Also at time T10, retransmission of packet 912 begins, as illustrated by packet 912' in FIG. 9*c*. Transmission of retransmission packets 910' and 912' ends at time T14, three packet durations after time marker M. However, it is clear that retransmission of packet 960 must be delayed until time T14, which is approximately 1.5 packets from time T8 which marks the end of reception activity attributable to packets 960 and 962. According to a modified system protocol adapted for "stacking" retransmissions for a second set of colliding packets (and, if necessary, yet further sets of colliding packets), retransmissions are scheduled at integer packet durations from time marker M. This is illustrated in FIG. 9*d*, in which retransmission packet 960' is transmitted beginning at a time T14, three packet durations after time marker M, and packet 962' is retransmitted beginning at a time T16, which is 4 packet durations after time marker M.

Figure 11A:
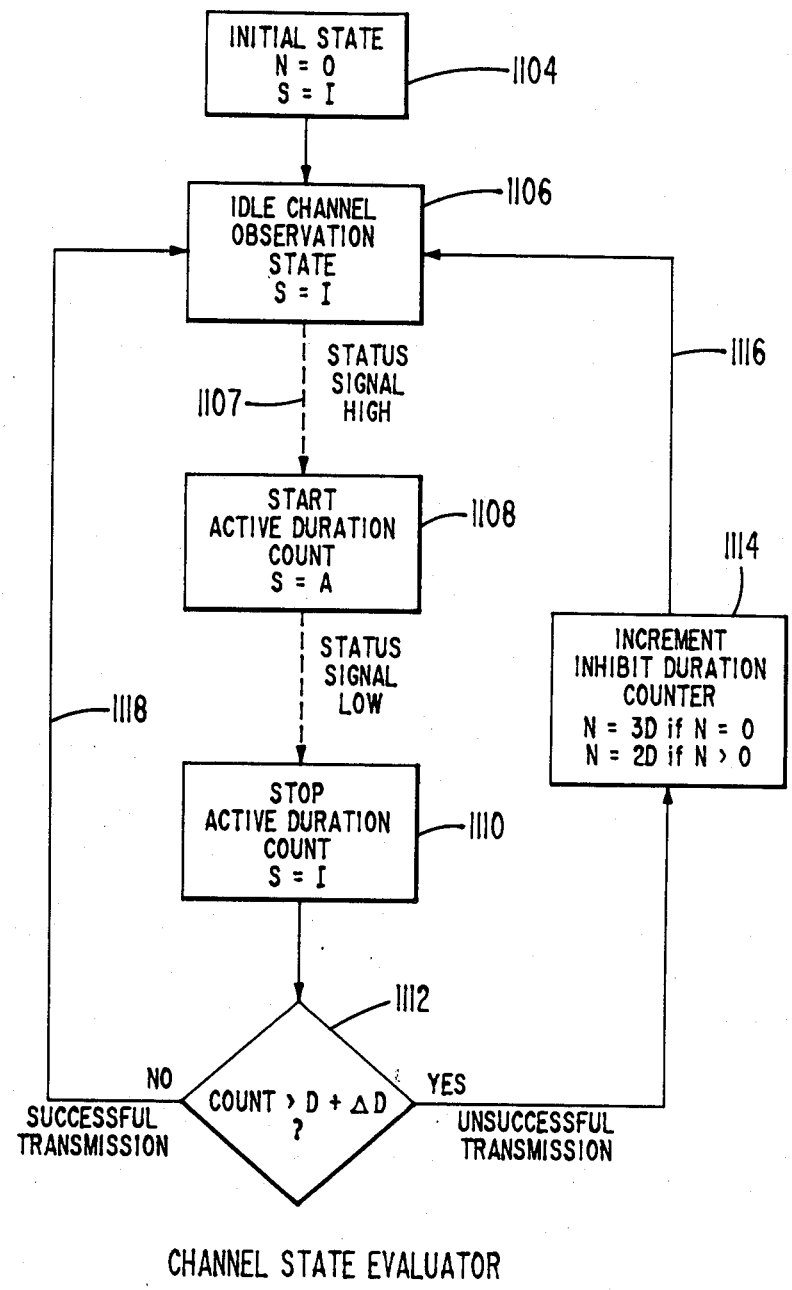
FIGS. 11a and 11b are flow charts describing the logic sequence of operation of an embodiment of the invention for scheduling retransmission in the apparatus of FIG. 10 according to the method illustrated in FIG. 9.
Figure 11B:
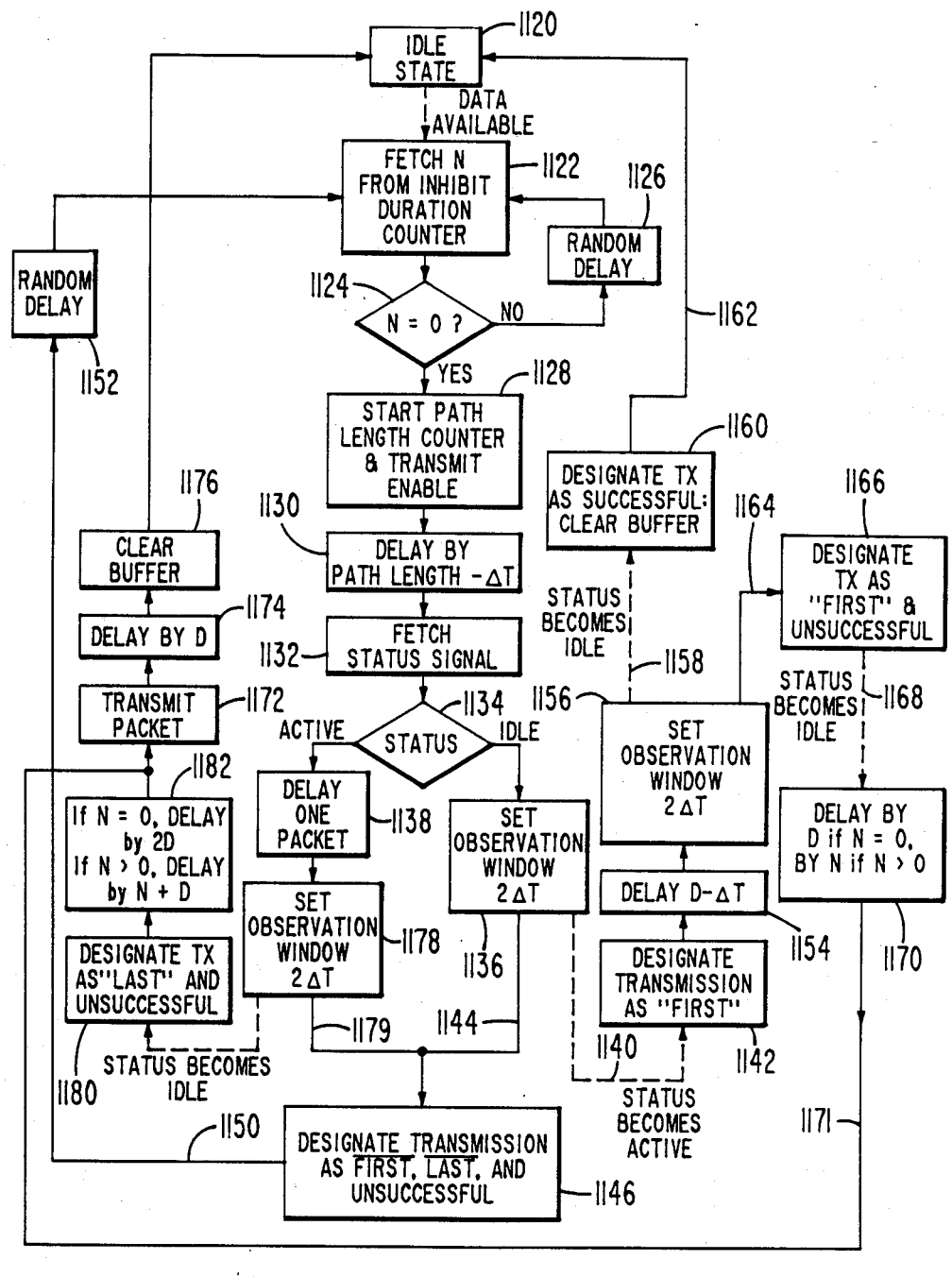

FIG. 10 is a simplified block diagram of portions of Earth station 10 arranged for software control of the retransmission protocol. In FIG. 10, elements corresponding to those of FIG. 6 are designated by the same reference numerals. A substantial portion of the hard wired logic illustrated in FIG. 6 is replaced by a logic circuit 1010. Logic circuit 1010 receives the STATUS signal on conductor 7*d* from activity detector 696, and also receives DATA AVAILABLE signals from buffer 614. Logic circuit 1010 responds with a TRANSMIT ENABLE signal which is applied to AND gate 626 to clock data from buffer 614, and a CLEAR signal which is applied to clear data from buffer 614. Logic circuit 1010 simultaneously runs through two program loops, a first for evaluating the status of the receiving end of the channel (FIG. 11*a*), and a second for control of transmission and retransmission in response to that status (FIG. 11*b*). Thus, logic circuit 1010 includes a pair of cooperating microprocessors, or a single microprocessor appropriately multiplexed.

The sequence of operations required for the stacking of retransmissions is more readily understood from flow charts than from hard wired logic. FIGS. 11*a* and 11*b* (hereinafter referred to jointly as FIG. 11) illustrate the logic flow corresponding with the arrangement of FIG. 6, further including a stacking function. In the logic flow diagrams of FIG. 11, operating states are illustrated by rectangles and decision points by diamonds. Fixed or noncontingent flow paths are indicated by solid lines, and paths which are contingent upon extrinsic events or states are indicated by dotted lines.

In FIG. 11*a*, the initial program state is illustrated as a block 1104. In this initial state, the status (S) is idle (I), and N (the unexpired mandatory inhibited or idle period yet remaining) is 0. Block 1104 is coupled to a block 1106 representing an idle channel observation state in which status S=I. The state represented by block 1106 continues until the STATUS signal goes to a logic HIGH level, at which time the logic reaches block 1108 by a contingent or interrupt path 1107, which starts an active duration counter internal to logic circuit 1010 (FIG. 10), which counts for the duration of the active interval. Counting continues until such later time as the STATUS signal goes to a logic LOW level, which produces a condition illustrated by block 1110 in which the active duration counter is stopped, and immediate evaluation of the contents of the counter is performed at decision block 1112. If the counted duration is greater than a packet duration (D) plus an incremental value $\Delta D$, the active period is designated an unsuccessful transmission, and logic flow is directed to block 1114. The identification of an unsuccessful transmission suggests that two retransmissions will follow. An inhibit duration counter internal to logic circuit 1010, illustrated as 1020 in FIG. 10 is incremented by three packet durations (3D) if the initial value N is zero, and by 2D if N is greater than zero. Inhibit duration counter 1020 is a count-down counter which continually clocks towards zero value. Thus, the contents of the inhibit duration counter represents the length of time remaining in which all transmitter-receivers of the system remain idle if they were not involved in a collision. At decision block 1112, a count of less than $D+\Delta D$ represents a successful transmission which directs the logic along path 1118 back to block 1106. The value of inhibit duration counter 1020 of FIG. 11*a* is used in the logic of FIG. 11*b*.

Figure 12A:
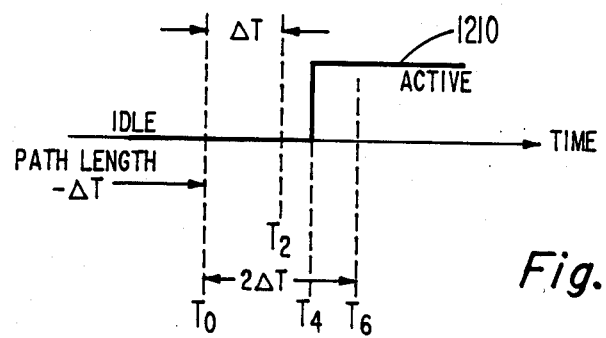
FIG. 12 is a time diagram illustrating occurrences during window intervals set by the logic of FIG. 11b.
Figure 12B:
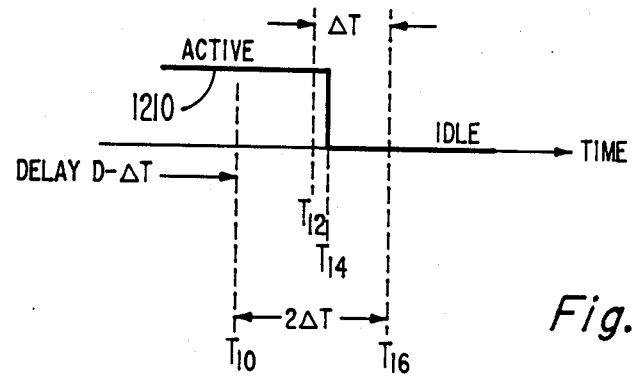

As mentioned, the logic illustrated in FIG. 11*b* is the retransmission control logic. The idle state is represented at the top of FIG. 11*b* by a block 1120. When the DATA AVAILABLE signal (FIG. 10) goes logic HIGH, the logic is directed to block 1122, where the value of N from inhibit duration counter 1020 (FIG. 10) is coupled to a decision block 1124. Block 1124 compares N with zero. If N is other than zero, this indicates that there is an unexpired period of retransmission currently existing, and no new transmissions may be initiated. Thus, the logic is directed by the NO output of block 1124 to a random delay block 1126, at the expiration of which delay the state again reaches block 1122. Sooner or later, the period of inhibition ends, and decision block 1124 directs the logic to the YES output and to block 1128. Block 1128 represents the starting of counting by a path length counter internal to logic circuit 1010 (FIG. 10), and generation of a TRANSMIT ENABLE signal, which is applied from logic circuit 1010 to AND gate 626 (FIG. 10) to apply clock pulses to buffer 614 to cause a packet to be transmitted. The logic then flows to a block 1130 which represents a delay by a duration equal to the path length minus an incremental amount ΔT. After the delay, the logic continues to block 1132 at a moment just before the expected time of arrival of the leading edge of its own packet. Block 1132 represents the latching of the STATUS signal, which is applied to a decision block 1134 where its status as either idle (logic LOW) or active (logic HIGH) directs the logic to one of blocks 1136 or 1138. Assuming that the STATUS signal just before the time of arrival of its own packet is idle, as illustrated at time T0 of FIG. 12a, the logic proceeds to block 1136, which sets an observation window having a duration of twice the incremental time (2ΔT). In FIG. 12a, the expected time of arrival of its own packet is time T2, and the observation window having a duration of 2ΔT extends from time T0 to time T6. If, as illustrated at time T4 within the time window, the STATUS signal 1210 becomes active, the logic proceeds by contingent or interrupt path 1140 to a block 1142, which represents the designation of the transmission as a "first" transmission. On the other hand, if the STATUS signal does not go to a logic HIGH level representing active reception of signal, the logic proceeds by default path 1144 from block 1136 to a block 1146. Block 1146 represent designation of the transmission as unsuccessful, and as unresolved (neither first nor last). Clearly, if the own packet is not received as expected, the transmission is in fact unsuccessful, and cannot be identified as being either first or last. When the logic state represented by block 1146 is reached, path 1150 directs the imposition of a random delay represented by block 1152, followed by a return to block 1122. Assuming that the STATUS signal makes a transition as illustrated in FIG. 12a and the logic flow has therefore reached block 1142, it is still not known whether the transmission is successful or unsuccessful, because reception of the own packet is not yet complete. Block 1154 follows block 1142, and represents a delay of the logic by an amount (D−ΔT) slightly less than one packet duration. In block 1156, another observation window having a duration of 2ΔT is set, beginning at a time T10 and ending at a time T16, as illustrated in FIG. 12b. In FIG. 12b, the expected time of arrival of the lagging edge of the packet is time T12, midway between times T10 and T16 which define the observation window. The actual time of arrival of the lagging edge is illustrated as T14. At times preceding time T14, the STATUS signal 1210 is at a logic HIGH level representing an active receiving condition, and thereafter it is a logic LOW level representing an idle channel. With the signal state illustrated in FIG. 12b, the logic LOW representing an idle condition directs the logic from block 1156 along interrupt path 1158 to block 1160, which represents designation of the transmission as successful (the active interval being preceded and followed by an idle interval), and a CLEAR signal is generated which clears buffer 614 (FIG. 10). The system then returns by path 1162 to an idle state represented by block 1120.

If the STATUS signal 1210 in FIG. 12b had continued logic HIGH, representing an active condition, throughout the entire observation window interval T10–T16, this would indicate that the own packet received is followed by other packets, and the transmission is probably unsuccessful. In this event, the logic is directed from block 1156 along default path 1164 to a block 1166. Block 1166 represents designation of the transmission as unsuccessful, and first among the colliding packets. At some time thereafter, reception activity ceases, and the status signal becomes a logic LOW, representing an idle reception condition. This is the time marker from which retransmissions are timed. Interrupt path 1168 directs the logic to a block 1170 which represents a delay which depends upon the value of N established by the inhibit duration counter 1020 (FIG. 10). If the current status of N is zero, block 1170 delays by one packet duration (D), whereas if N is other than zero the delay is by N. At the expiration of the delay interval, path 1171 leads to a block 1172, representing generation of a TRANSMIT ENABLE signal (FIG. 10) for application to gate 626 to initiate retransmission of the data stored in, and not yet cleared from, buffer 614. This is followed by a further delay equal to one packet duration, as represented by block 1174, after which buffer 614 is cleared by block 1176. Clearing of the buffer is the last step before the system returns to the idle condition represented by block 1120.

If the STATUS signal had been a logic HIGH level at time T0 as illustrated in FIG. 12a, this would indicate that the receiving end of the transmission channel was active before its own packet was expected. As mentioned, this directs the logic from decision block 1134 to a delay block 1138. The delay imposed by block 1138 expires at a time near T10 as illustrated in FIG. 12b, which precedes the expected time of arrival of the lagging edge of the own packet. An observation window having a duration of 2ΔT is set in block 1178. If, within the observation window, the STATUS signal does not become a logic LOW level, this indicates that the own packet is unresolved, and the logic proceeds over path 1179 to block 1146, and then by path 1150 for retransmission at a random time. If the STATUS signal becomes logic LOW within the observation window set by block 1178, the own packet is designated as being last in collision (block 1180). The logic then proceeds to block 1182, which evaluates the value of N from counter 1020 (FIG. 10), and delays by 2D if N=0, and by N+D if N is greater than zero. From block 1182 we reach block 1172 after the prescribed delay, and a packet is transmitted as represented by block 1172, and the buffer is then cleared. Thus, it can be seen that the logic represented by FIGS. 11a and 11b together accomplishes the stacked retransmission control illustrated by the timing diagram of FIG. 9.

Figure 13:
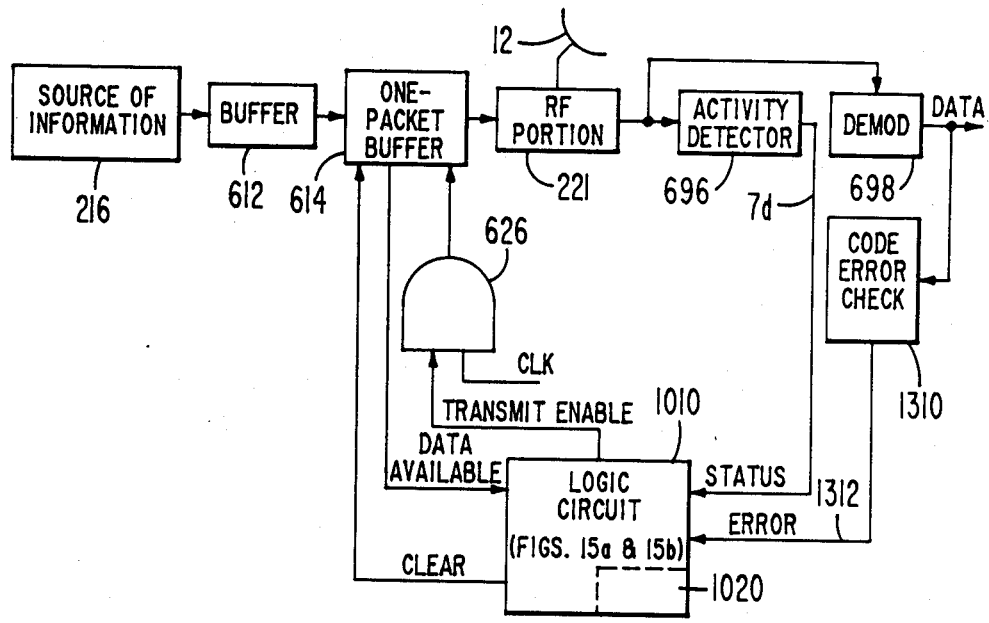
FIG. 13 is a block diagram of an Earth station according to another embodiment of the invention, which is adapted for resolving more than the first and last packets in a collision.

As so far described, the system protocol resolves the first and last packets among two or more packets involved in collision, and schedules retransmission of the first and last packets in a conflict-free manner. This type of control is termed "binary". System capacity can be substantially increased if more packets can be resolved from each collision. For example, if the first, second and last packets involved in the collision can be resolved, the retransmission interval can be extended by a further packet duration, and three packets can be retransmitted in a conflict-free manner, rather than two. This is termed modified ternary control. FIG. 13 is a simplified block diagram of an apparatus adapted for generating information which is capable of resolving three packets for each collision. Elements of arrangement of FIG. 13 corresponding to those of FIG. 10 are designated by the same reference numerals. The arrangement of FIG. 13 is substantially identical with that of FIG. 10, except for the addition of a code error checking block 1310 coupled to receive demodulated data from the demodulator 698 for continually performing parity or CRC checks on small blocks of the demodulated data, and for generating an ERROR signal when an error is detected. The ERROR signal is applied over a conductor 1312 to logic circuit 1010.

Figure 14A:
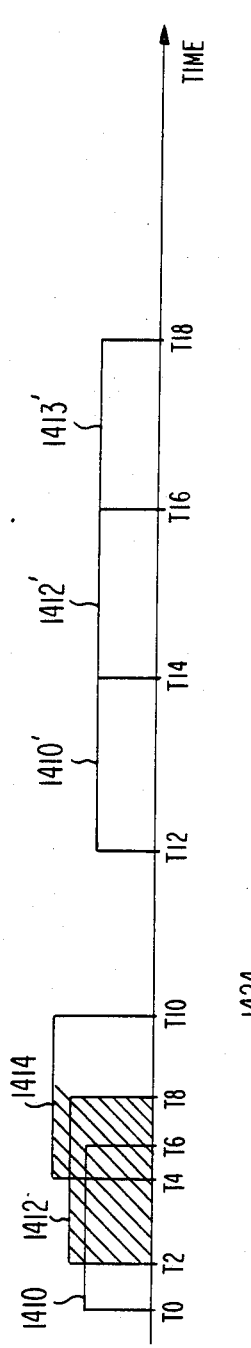
FIGS. 14a–14d are timing diagrams illustrating resolution of more than two packets, and retransmission according to a predetermined schedule.
Figure 14B:
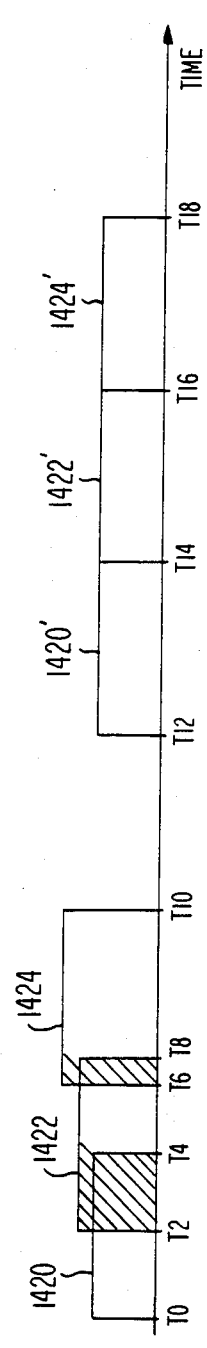
Figure 14C:
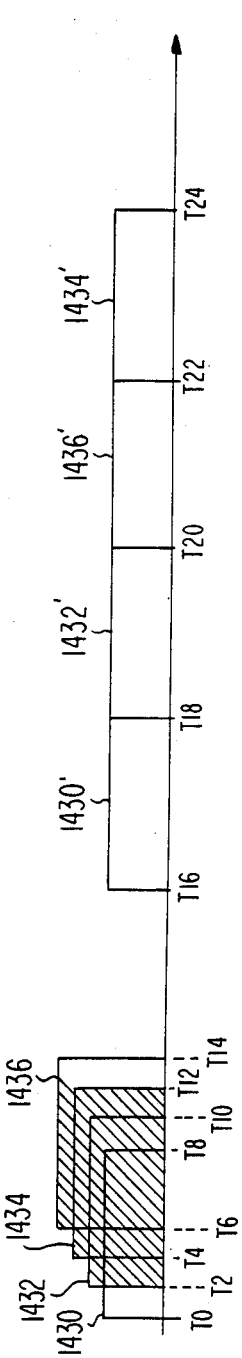
Figure 14D:
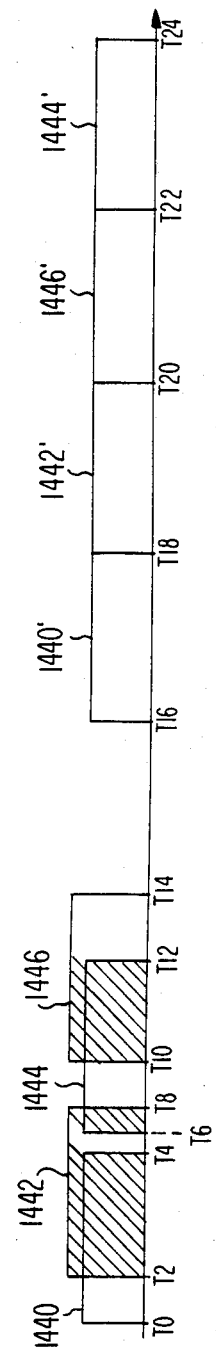

FIG. 14a illustrates received packets 1410, 1412 and 1414 received within an interval T0–T10. As illustrated, packet 1410 is received in the interval T0–T6, packet 1412 received in the interval T2–T8, and packet 1414 is received in the interval T4–T10. FIG. 14a represents modified ternary control, in that the information in packets 1410, 1412 and 1414 is retransmitted as packets 1410', 1412' and 1414' during scheduled successive intervals T12–T14, T14–T16 and T16–T18, respectively. FIG. 14b also represents a collision of three packets 1420, 1422, and 1424, in a somewhat different configuration. In FIG. 14b, only one packet is received in the interval T4–T6. Modified ternary retransmission control resolution and scheduled retransmission of first and last, and one of the second and penultimate packets involved in the collision allows retransmission packets 1420', 1422' and 1424' to be scheduled. FIGS. 14c and 14d represent different configurations of four-packet collisions, and ternary control (resolution and scheduled retransmission of first, second, penultimate and last packets involved in the collision).

When receiving signals such as those of FIGS. 14a or 14b prior to time T0, activity detector 696 (FIG. 13) produces on conductor 7d a STATUS signal having a logic LOW level. Prior to time T0, the output of code checker 1310 on conductor 1312 is logic LOW. Beginning at time T0 and until time T2, signal packet 1410 is received, and consequently the STATUS signal is logic HIGH, and the ERROR signal on conductor 1312 is a logic low, since ordinarily there will not be any errors in the received data. In the interval T2–T8 as illustrated in FIG. 14a, the arrangement of FIG. 13 is receiving two or more signals, and consequently a collision is occurring. As mentioned, the data then becomes scrambled and code checker 1310 will produce an ERROR signal which is logic HIGH on conductor 1312 beginning at or near time T2. In the interval T8–T10, activity detector 696 produces a logic HIGH signal, and the ERROR signal is logic LOW, since only one signal is being received. After time T10, both the STATUS and ERROR signals are logic LOW.

With the given information, it is possible to determine which packet is first, which is second, and which is last. If the leading edge of the own packet as received is preceded by a period of inactivity at the receiver (a logic LOW level on conductor 7d), and the STATUS signal goes to a logic HIGH level at the moment the leading edge of the own packet is expected, but the ERROR signal does not go to a logic HIGH level until a later time, the packet is clearly the first in collision, a condition such as that of packet 1410 of FIG. 14a or 1420 of FIG. 14b. If, on the other hand, the receiving end of the transmission path is active (as indicated by a logic HIGH level of the STATUS signal) immediately preceding the time the leading edge of the own packet is expected, and the ERROR signal is logic LOW, the own packet is probably second in collision, since only one other signal is being received prior to the time that the own signal arrives. Such a state corresponds to that of packet 1412 of FIG. 14a or of packet 1422 of FIG. 14b. A packet can be established as being last among those colliding if its lagging edge is followed by a logic LOW level of the STATUS signal, representing no activity following, and if its leading edge is preceded by a logic HIGH level of the STATUS signal, with or without a HIGH level of the error signal.

FIGS. 14c and 14d illustrate collisions of four packets. The first, second and last packets may be resolved as described in conjunction with FIGS. 14a and 14b. Further, the penultimate packet such as packet 1434 may also be resolved. A packet is penultimate if its leading edge is preceded by a logic HIGH level of the STATUS signal, with a logic HIGH level of the ERROR signal, and its lagging edge (time T12 in FIG. 14c) is followed by a condition extending until the end of reception activity in which a logic HIGH level of the STATUS signal is accomplished by a logic LOW level of the ERROR signal. When the first, second, penultimate, and last packets are resolved in this manner, ternary retransmission occurs as illustrated in the interval T16–T24, by retransmission of the data during an interval of four packet durations following a one-packet delay.

Figure 15A:
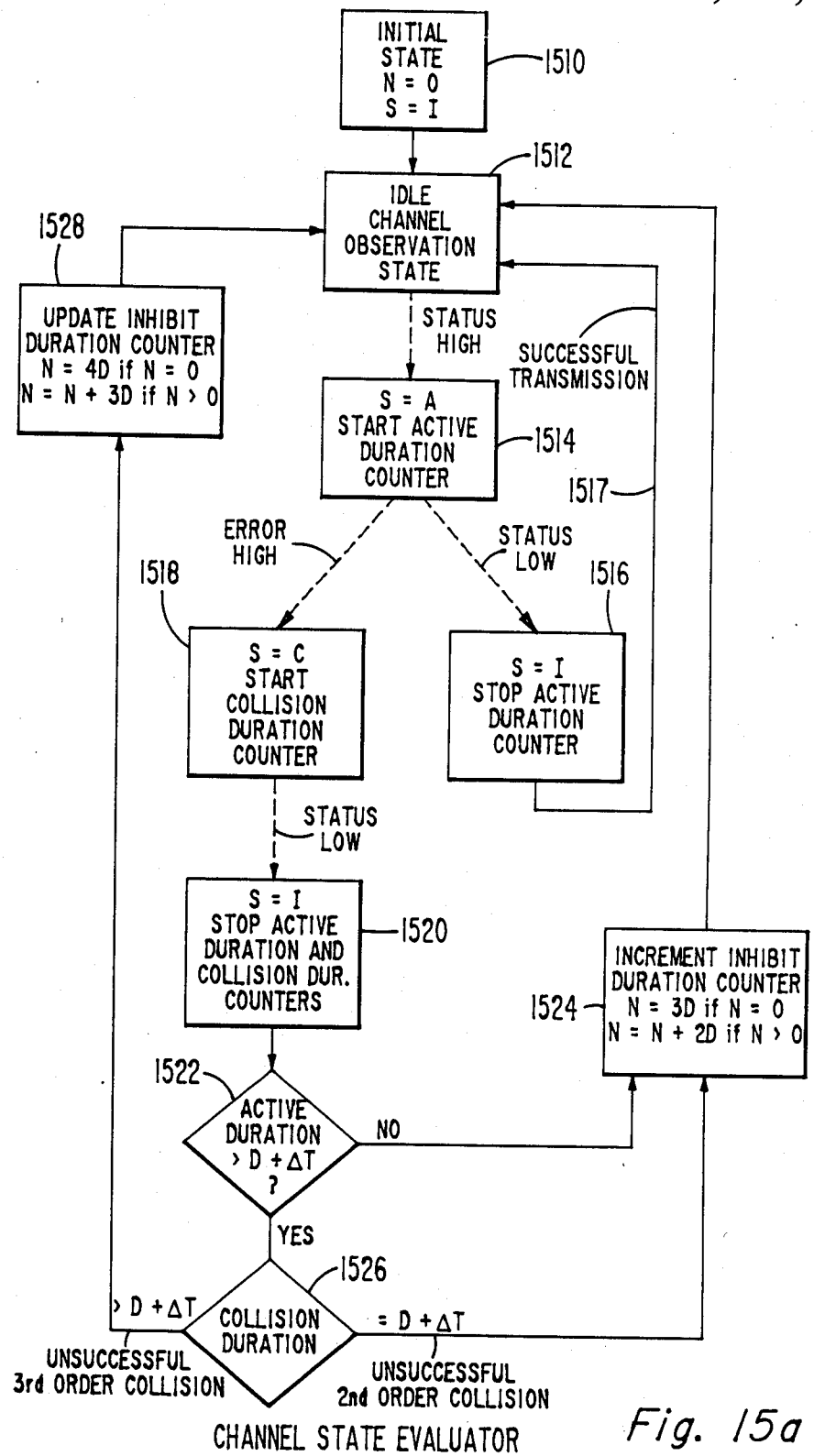
FIGS. 15a and 15b are flow charts describing the logic sequence of operation of a scheduler of the apparatus of FIG. 13 to implement the protocol illustrated in FIGS. 14a and 14b.
Figure 15B:
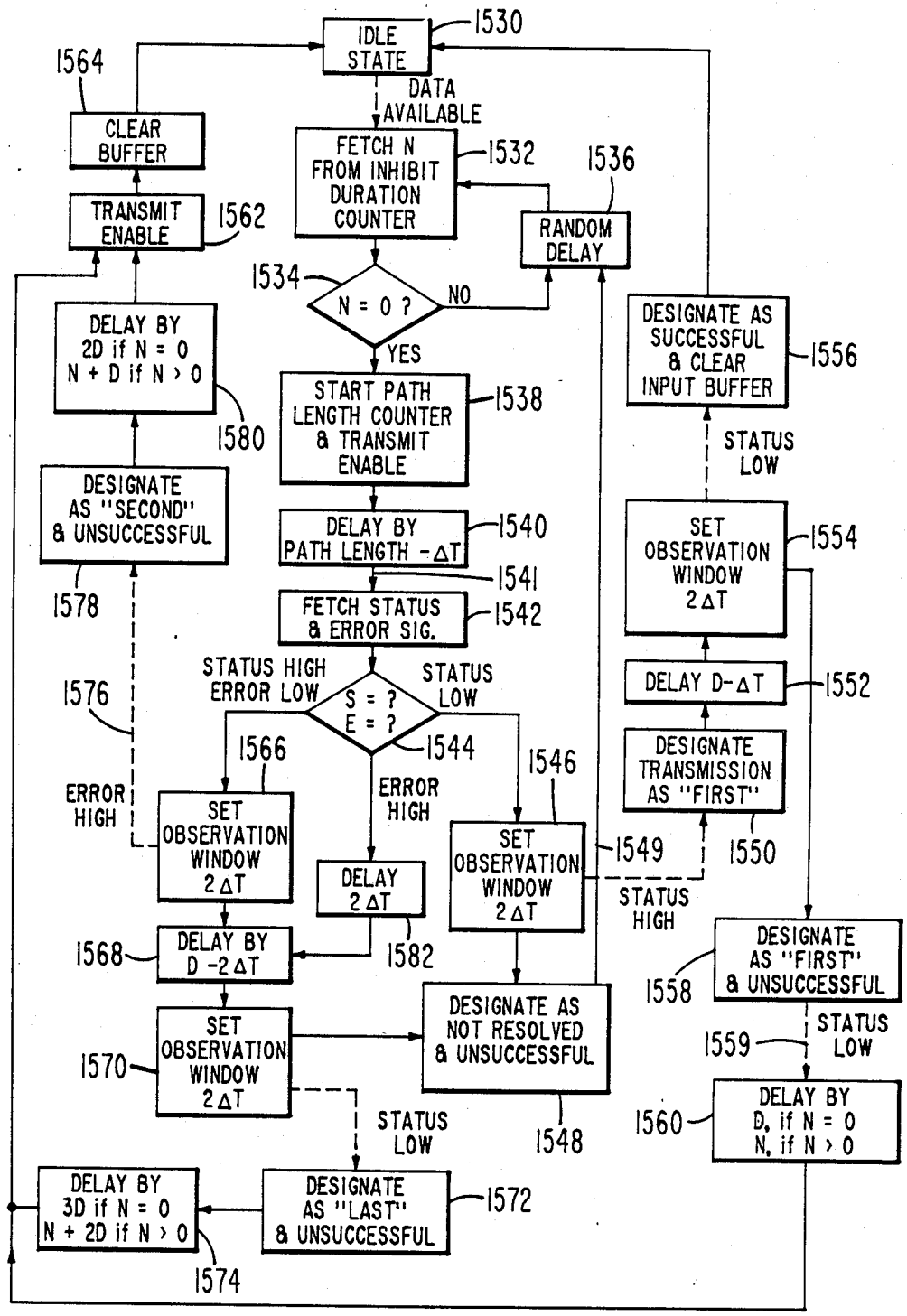

FIG. 15a is a flow chart illustrating the operation of a portion of the programming of logic circuit 1010 (FIG. 13), and FIG. 15b is a flow chart illustrating the operation of the remaining portion of logic circuit 1010. The logic operations illustrated by the flow charts of FIGS. 15a and 15b operate concurrently, or they may be multiplexed in an appropriate manner. The logic operations of FIG. 15a evaluate the state of the channel and establish the remaining duration of a period of inhibition. The logic of FIG. 15a begins with an initial state illustrated as a block 1510 which represents a remaining period of inhibition (N) of zero, and a status which is idle (S=I). This proceeds to a block 1512 which represents observation of an idle channel. The logic remains in this condition until a time at which signal reception occurs, at which time the STATUS signal goes to a logic HIGH level, whereupon the logic proceeds to block 1514 in which status (S) is active (A), and which starts the count of an active duration counter which is internal to logic circuit 1010. One of two things can then happen. The STATUS signal can go to a logic LOW level, which directs the logic to block 1516, which stops the active duration counter and represents a successful transmission, and the logic is then directed over path 1517 back to block 1512. Otherwise, the error signal can go to a logic HIGH condition (indicative of a collision and suggesting simultaneous reception of two packets), which directs the logic to block 1518 in which the status is collision (S=C). Block 1518 represents the beginning of counting by collision duration counter 1020, internal to the logic of circuit 1010. Eventually, the STATUS signal will go to a logic LOW condition, representing the cessation of reception activity, which stops the active duration counter and the collision duration counters in block 1520. The logic then proceeds to a decision block 1522 which compares the count of the active duration counter with the duration of a packet (plus a tolerance). If the active duration in a collision situation does not exceed one packet duration, this indicates that two packets were received simultaneously, and the logic is directed by the NO output to a block 1524. Ordinarily, the signals are not received simultaneously, and the active duration will exceed one packet length, whereupon the logic is directed by the YES output of block 1522 to a further decision block 1526. The collision duration is evaluated in block 1526, and if the duration of the collision as established by the duration during which the ERROR signal is a logic HIGH level equals the duration of a packet (D) plus an increment, the collision is probably between only two packets, whereupon the logic is directed once again to block 1524, in which count-down inhibit duration counter 1020 is incremented. The count (N) is set to 3 packet durations (3D) if the initial value of N is zero, and the count N is set to N+2D is N is initially greater than zero. The value of N is used for further logic processing. If the evaluation of the duration of a collision at decision block 1526 indicates that the collision duration exceeds a packet duration, this indicates that three or more packets were involved in the collision, and the logic is directed to block 1528, which updates the inhibit duration counter with different values then does block 1524. Block 1528 sets the value of N to 4D if the initial value of N is zero, and increments the value of N to a value of N+3D if the initial value of N is greater than zero. After incrementing of the counter, the logic of FIG. 15a returns to the idle channel observation state represented by block 1512.

The logic of FIG. 15b controls the retransmission of the first, second and last packets in a collision (modified ternary control). In FIG. 15b, block 1530 is an idle state, and the logic goes to a block 1532 when a DATA AVAILABLE signal is generated by buffer 614 (FIG. 13). The value of N stored in the inhibit duration counter is compared with zero in a decision block 1534. If N is not zero, a period of transmission inhibition is in effect, and the NO output of block 1534 returns the logic to block 1532 after a random delay represented by block 1536. IF N=0, the YES output of block 1534 directs the logic to block 1538, which represents the generation of a TRANSMIT ENABLE SIGNAL for application to gate 626 of FIG. 13, and the simultaneous starting of an internal path length counter. Thereafter, the logic is delayed, as represented by block 1540, by the duration of the path length minus a small time increment ΔT. After the delay, block 1542 fetches the STATUS and ERROR signals and evaluates them. If the STATUS signal is logic LOW, an observation window having a duration 2ΔT is set in block 1546. If the status signal does not, within the window, go a logic HIGH level, the default condition from block 1546 is block 1548, which represents an unsuccessful transmission in which the own packet is not resolved, which returns the logic to block 1532 by way of path 1549 and random delay 1536. Ordinarily, the STATUS signal will go to a logic HIGH level during the observation window, leading to block 1550, representing the designation of the returned own packet as first. A delay equal to one packet duration minus an increment is set in block 1552, and then an observation window having a duration of 2ΔT is set in block 1554. If the STATUS signal goes to a logic LOW level during the observation window set in block 1554, block 1556 designates the transmission as successful and applies a CLEAR signal to buffer 614 (FIG. 13), and the system returns to the idle state of block 1530. If the STATUS signal does not go to a logic LOW level during the observation window set by block 1554, block 1558 represents designation of the own packet as "first" and unsuccessful. Thereafter, the STATUS signal eventually goes to a logic LOW level representing the end of reception activity, which is the time marker from which retransmissions are timed. The logic flows by interrupt path 1559 from block 1558 to block 1560. Block 1560 delays by one packet duration (D) if the value of N is zero, and delays by N if N is other than zero, after which a TRANSMIT ENABLE signal is generated and applied to gate 626 as represented by block 1562, the CLEAR signal is applied to buffer 614 in block 1564, and the system returns to an idle state.

At decision block 1544, if the own packet is not first, either the channel is active (STATUS logic HIGH, ERROR logic LOW before the leading edge arrives), or there is a collision (both STATUS and ERROR signals logic HIGH). The active condition directs to a block 1566, which sets an observation window. If, within the observation window, the ERROR signal does not go to a logic HIGH level, the default condition directs the logic to a delay of one packet (D) minus an incremental amount (ΔT) as represented by block 1568, followed by a setting of a further observation window about the expected time of arrival of the last portion of the own packet. If the STATUS signal goes to a logic LOW level within the observation window, the logic proceeds to a block 1572 representing designation of the own packet as last and unsuccessful. The default condition from block 1570 is an indeterminate unsuccessful packet, which is directed to block 1548 for a further try, as described above. Designation of the own packet as last in block 1572 requires a delay of 3 packet durations (3D) if the initial value of N is zero, and by the value of N plus 2 packet durations (N+2D) if N is greater than N zero, as represented by block 1574. After the delay imparted by block 1574, a retransmission packet is transmitted as indicated by block 1562. Thus, identification of the own packet as last in collision results in a retransmission packet beginning 3D after the end of the time marker, as illustrated in FIGS. 14a and 14b for modified ternary control.

If, within the observation window set by block 1566, the error signal goes to a logic HIGH level, the logic is directed by interrupt path 1576 to a block 1578, which represents designation of the own packet as second and unsuccessful. This designation requires the imposition of a delay of 2D if N is zero, and by N+D is N is greater than zero, as represented by block 1580. After the delay imparted by block 1580, a packet is transmitted, as indicated by block 1562. Thus, identification of the own packet as second in collision in a modified ternary control system results in retransmission after a delay of 2D, as illustrated in FIGS. 14a and 14b for a nonstacked condition, and after a delay of N+D for the stacked condition (not illustrated in FIG. 14a).

If the receive end of the transmission path is in a collision condition, as indicated by a logic HIGH level of the ERROR signal, at the time the leading edge of the own packet is received, this packet might be a last packet in a collision, as for example packet 1414 is FIG. 14a. Decision block 1544 in that event directs the logic to a block 1582 for a delay by an amount 2ΔT, and a return to block 1568, which imparts a further delay of D−ΔT. In block 1570, the observation window is set about the lagging edge of the own packet, and identification of the own packet as last or as indeterminate proceeds as described above.

Figure 16:
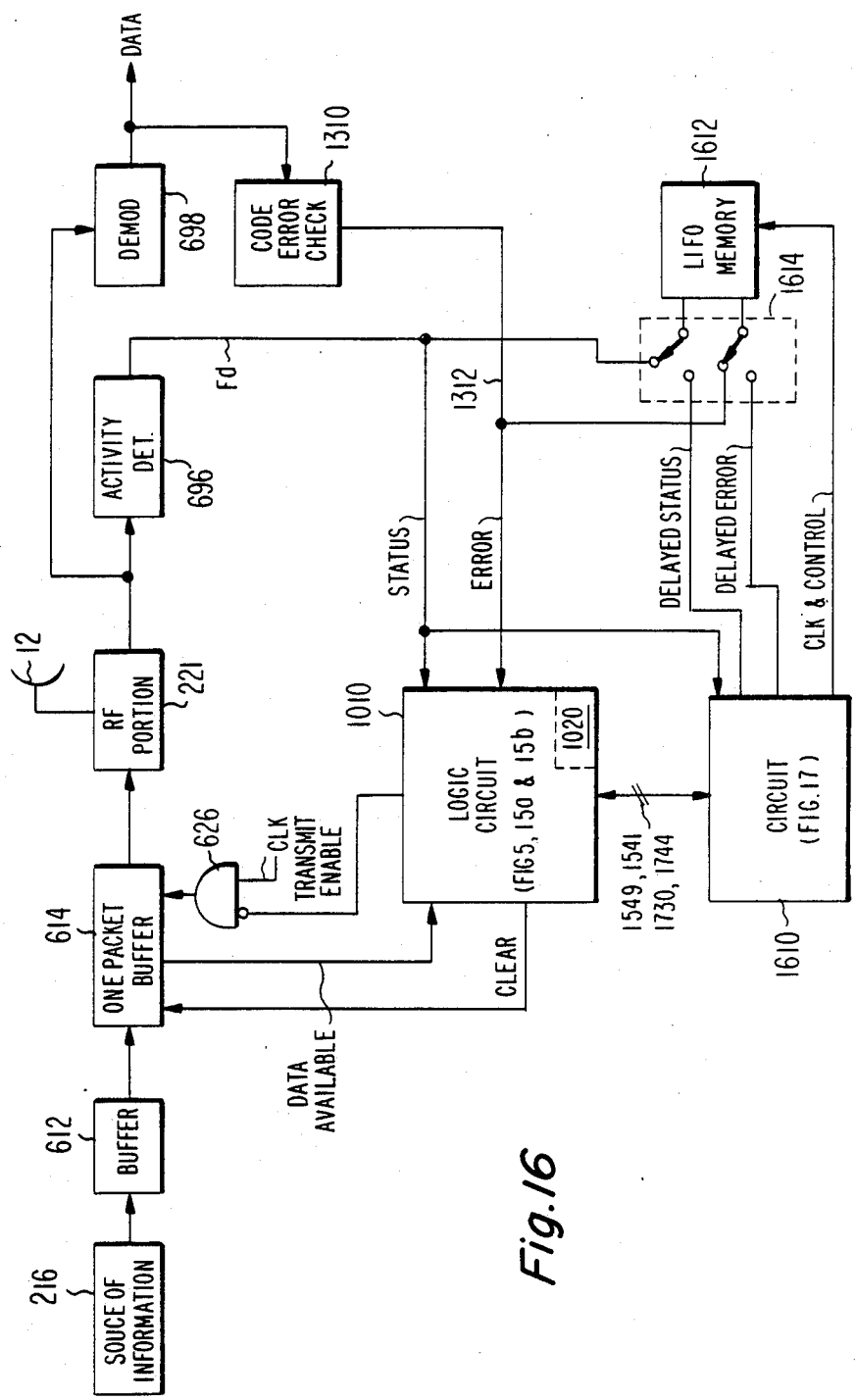
FIG. 16 is a block diagram of an Earth station according to another embodiment of the invention, which is adapted for resolving four packets in a collision.

FIG. 16 is simplified block diagram of an arrangement according to the invention for resolving four packets from among those colliding and for scheduling four packets (ternary control). FIG. 16 is similar to FIG. 13, and elements corresponding to those of FIG. 13 are designated by the same reference numeral. The arrangement of FIG. 16 includes a last in, first out (LIFO) memory 1612 coupled by a switch arrangement 1614 to conductors 7d and 1312. In the alternate position (not illustrated) of switch arrangement 1614, memory 1612 is decoupled from conductors 7d and 1312, and is coupled instead to a further logic circuit 1610 which communicates by a multiconductor cable with logic circuit 1010.

Generally speaking, the penultimate packet is related to the remaining packets involved in a collision in a manner which is the time reverse of the manner in which the second packet is related to other packets. Consequently, the arrangement of FIG. 16 resolves and schedules retransmission of the first, second, and last packets using the logic of FIG. 15b. The arrangement of 16 also stores the STATUS and ERROR signals until a time just after the end of reception activity involving a collision, and the stored signals (termed DELAYED STATUS and DELAYED ERROR) are then applied in reverse order to a further logic circuit 1610, which is programmed with logic similar to that which resolves the second packet. Retransmission of the penultimate packet is delayed, as illustrated in FIG. 14c and 14d, until a time beginning at time T22. Time T22 begins four packet durations after the time marker established at time T14, and there is ample time for performing further logic operations before the penultimate packet must be retransmitted.

Figure 17A:
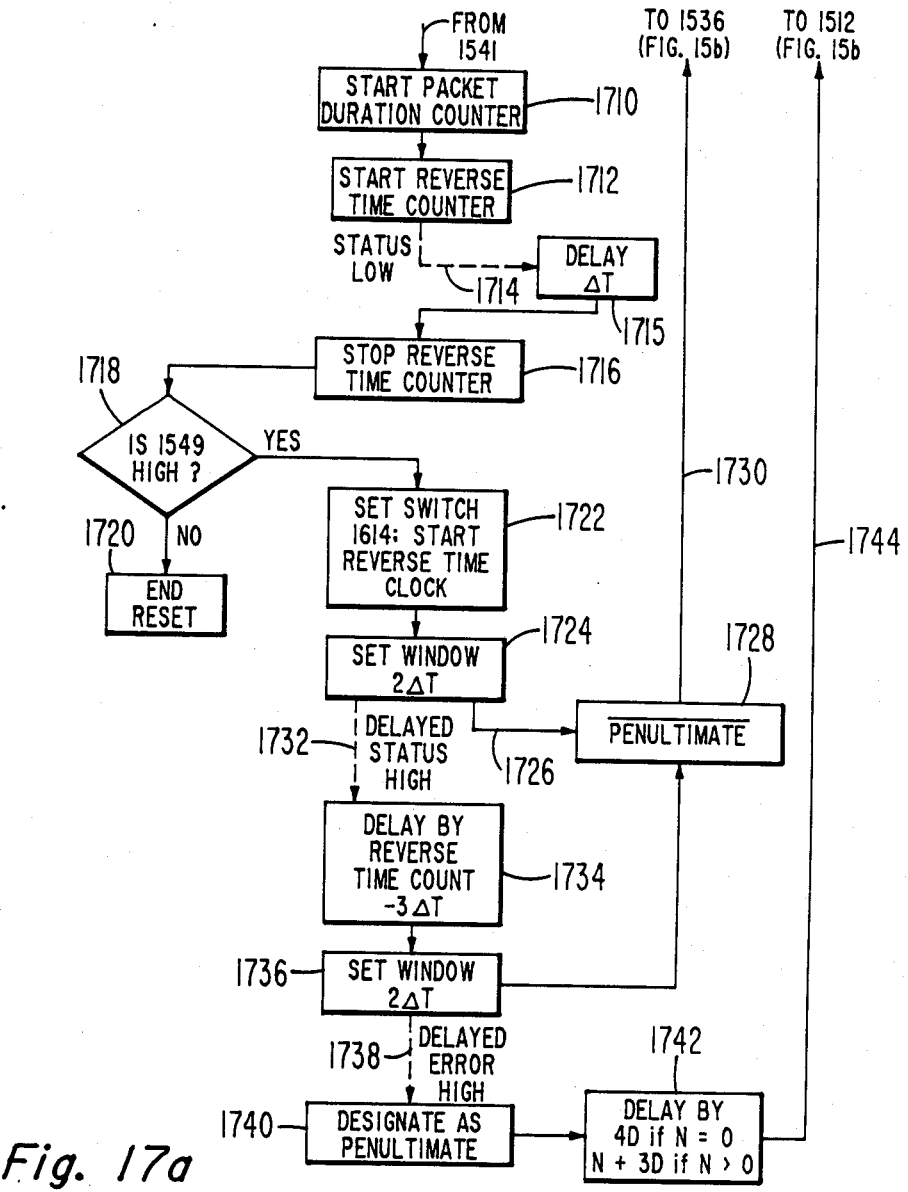
FIG. 17a is a flow chart adapted for the use in the arrangement of FIG. 16 for resolving a penultimate packet and for scheduling the retransmission in accordance with the protocol of FIGS. 14c and 14d.
Figure 17B:
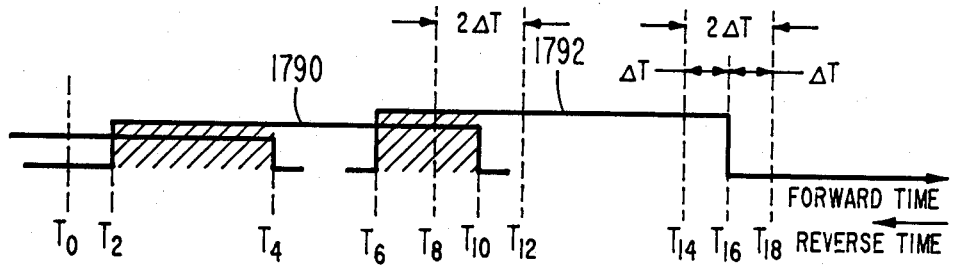

FIG. 17a illustrates logic flow in logic circuit 1610 of FIG. 16. The logic illustrated in FIG. 17 is a continuation of the logic flow of that in FIG. 15b, starting from path 1541 (FIG. 15b), which couples to a block 1710 a signal indicative of a time (TO of FIG. 17b) just before the leading edge of the own packet (1790 of FIG. 17b) is received. A packet duration counter internal to logic circuit 1610 is started, as represented by block 1710. At a time T8, which is ΔT before the end of packet 1790, block 1710 causes logic to flow to a block 1712, in which a reverse time counter is started. Writing of the STATUS and ERROR signals into LIFO memory 1612 (FIG. 16) begins. Counting continues in the reverse time counter until time T16, which is the end of activity on the channel, as indicated by the STATUS signal going to a logic LOW level at the end of a packet 1792, whereupon the logic flows by an interrupt path 1714 to a block 1715 where a further delay of ΔT is imposed. At time T18, logic flows to block 1716, which represents stopping of the reverse time counter. At this time, the reverse time counter has counted for a duration extending from time T8 just before the end of reception of the own packet (time T10) until the end of the active interval (time T18). The logic flow continues to a decision block 1718, in which the output of block 1548 of FIG. 15b (which appears on conductor 1549) is examined to determine whether the own packet has been designated as "not resolved" and "unsuccessful" (i.e. the own packet is neither first, second nor last in colliding packets). If the own packet has not been so designated, then presumably the own packet was successful, first, second or last, and the own packet is by definition not penultimate, and the logic flows to block 1720, which represents the end of computation and the resetting of counters. The YES output of decision block 1718 indicates that the packet has not been resolved as first, second or last, and directs the logic to a block 1722 which stops writing of signal into LIFO 1612, and then sets switch 1614 of FIG. 16 to its alternate position (not illustrated). At this time, the reverse time counter contains a preset representing the interval T8-T18. The value of this preset is stored for later use. Clocking of LIFO memory 1612 for reading of the stored STATUS and ERROR signals (in the form of DELAYED STATUS and DELAYED ERROR signals) begins. Logic processing using the DELAYED STATUS signal and DELAYED ERROR signal read from LIFO memory 1612 begins.

At the time (T18) that logic flows from block 1722 to block 1724, the delayed STATUS signal read from LIFO 1612 must already be logic LOW, because the STATUS signal had to make a transition to a logic LOW condition at time T16 to enable interrupt path 1714 and have the logic reach block 1722. An observation window having a duration of 2ΔT is set as represented by block 1724. This window extends from time T14 to "earlier" time T14, and the system looks for the DELAYED STATUS signal to go to a logic HIGH level. If it does not, the logic is directed by default path 1726 to a block 1728 which represents designation of the own packet as not penultimate (p̄ēn̄ūl̄t̄īm̄āt̄ē) which is coupled by a conductor 1730 to block 1536 of FIG. 15b, which represents an assignment of the information in the own packet to the queue of information awaiting retransmission at a random time.

If the DELAYED STATUS signal goes to a logic HIGH level within the window (time T18-T14) represented by block 1724, this verifies that the active interval ended at time T16, and interrupt path 1732 directs the logic to a block 1734. Block 1734 represents a delay by the amount of the stored preset from the reverse time counter, minus an increment 3ΔT. Thus, the delay represented by block 1734 delays from time T16 until "earlier" time T12. If the DELAYED ERROR signal goes logic HIGH during counting or delay in block 1734, this indicates that a collision occurred in the interval T8-T16, after the lagging edge of the own packet, and the own packet is therefore not penultimate. Interrupt path 1735 couples the logic to block 1728 in this event. The logic flows from block 1734 to block 1736 at time T12 just before the expected time at which the DELAYED ERROR signal will go HIGH if the own packet is penultimate. An observation window extending from time T12 to "earlier" time T8 is set in block 1736. The default condition from block 1736 directs the logic to block 1728. If the DELAYED ERROR signal goes logic HIGH within the window T12-T8 set by block 1736, interrupt path 1738 directs the logic to a block 1740, in which own packet 1790 is designated as being penultimate. Block 1740 is followed by block 1742 which provides a delay of 4 packet intervals if the current value of N is zero, and by N+3D if the current value of N is greater than zero, in accordance with the protocol as illustrated in FIGS. 14c and 14d. Thereafter, the logic flows by a path 1744 to block 1512 of FIG. 15d, which represents transmission of a retransmission packet. Thus, the arrangement of FIG. 16 together with the logic of FIGS. 15b and 17a provides resolution of the first, second, penultimate, and last packets involved in the collision, and schedules retransmission in an appropriate manner. If desired, the logic required to resolve a penultimate packet may be performed at high speed, to give an indication within less than one packet duration. Once LIFO memory 1612 is loaded, all the information necessary to make the determination has been received. LIFO 1620 may be unloaded at a clock rate higher than that at which it was loaded, and the logic flow of FIG. 17 may proceed at the highest practical rate. Minor modification of the logic of FIG. 15a is necessary for ternary control, to establish the presence of a fourth resolved packet; it is necessary only to establish that both the STATUS and ERROR signals are logic HIGH for a period in excess of one packet duration. It is believed that this modification is rendered obvious by the preceding discussion and examples.

Figure 18:
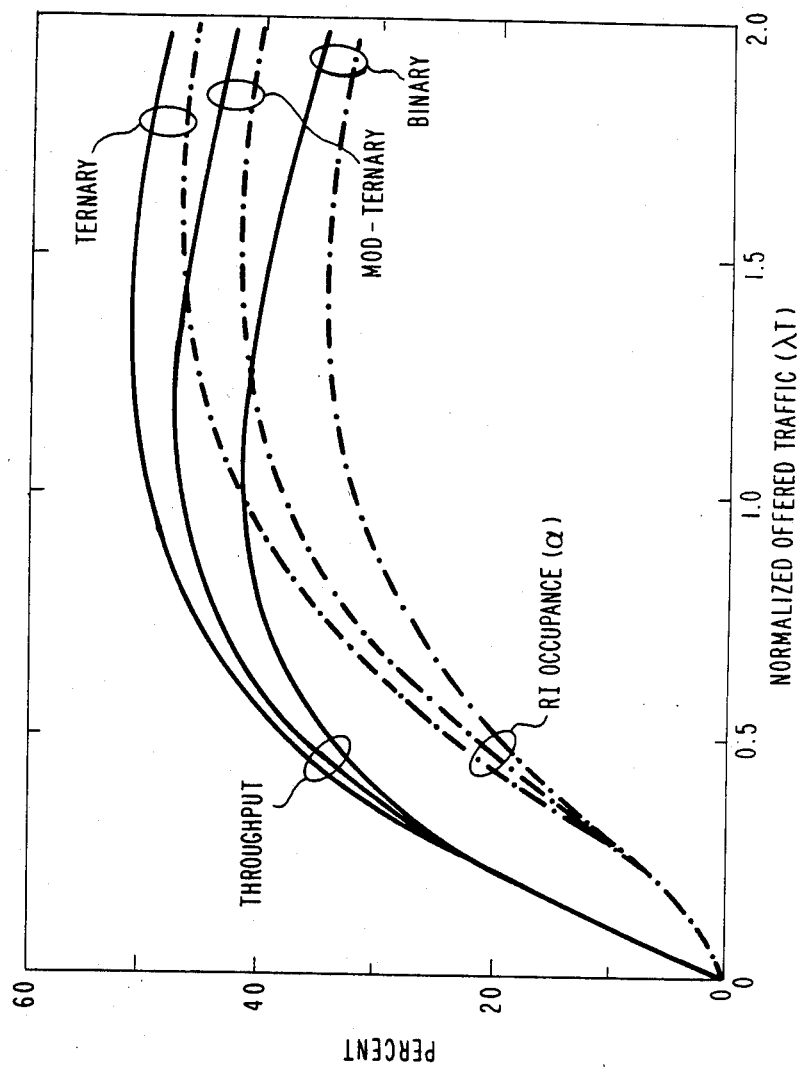
FIG. 18 is a plot of system throughput and occupancy.

FIG. 18 plots throughput as a function of normalized offered traffic (λT) for binary systems which resolve first and last packets; modified ternary systems which resolve first, second and last packets; and ternary systems which resolve first, second, penultimate and last packets. Normalized offered traffic is the amount of asynchronous mode traffic offered to the system as a whole for transmission, relative to the amount of information which could be transmitted over the system if the system were used for continuous transmission and hence had no inefficiencies. Values of λT less than 1.0 represent less offered traffic than the system is capable of handling, and values greater than 1.0 represent offered data which exceeds the maximum capacity of the system.

As can be seen, the throughput for binary operation reaches a maximum (the system has a capacity) of approximately 0.41 at a normalized offered traffic near 1.06. The throughput degrades gracefully above this value. Similarly, the capacity of the modified ternary system is approximately 0.43 at a normalized offered traffic of approximately 1.2. The ternary system has a capacity or maximum throughput of approximately 0.46. Also illustrated in FIG. 18 is the retransmission interval occupancy (α) this represents the portion of the total time which is devoted to scheduled retransmissions.

Other embodiments of the invention will be apparent to those skilled in the art. In particular, transmission paths such as fiber-optic or transmission-line local area networks can be used rather than a satellite transponder path. Terrestrial broadcasts can also be used while the propagation delay between transmitter-receivers in the illustrated embodiments is fixed, the timing elements, such as counter 632 of FIG. 6, may be made responsive to variations in the propagation delay. Various delays may be introduced into the various logic circuits as required to prevent race conditions. Positive or negative logic may be used as desired. Those functions illustrated as performed by hardware logic may instead be performed by software, and vice versa. If desired, the logic of FIG. 15b may include a counter for counting the number of errors indicated by the ERROR signal, so that a predetermined number of errors in parity are required before a collision condition is declared. While retransmission has been illustrated as scheduled in the order in which the packets occurred in the collision, any retransmission schedule is possible.

What is claimed is:

1. An asynchronous random access contention system for communicating among a plurality of transmitter-receives by way of a transmission path, comprising:
   transmission means associated with each transmitter-receiver adapted for receiving information to be transmitted, for forming the information into packets of uniform duration, and for originally transmitting said information at random times by way of said transmission path;
   receiving means associated with each transmitter-receiver and adapted for receiving from said transmission path its own packet and other packets originating from other transmitter-receivers;
   status determining means associated with each transmitter-receiver and coupled to said receiving means for establishing the presence of a collision involving only other packets, and for establishing the presence of a collision involving said own packet and in response thereto generating (a) a first signal if said own packet was first, and (b) a second signal if said own packet was last; and
   control and rescheduling means associated with each transmitter-receiver and coupled to said transmission means and to said status determining means for inhibiting all transmission from said transmission means for a period equal to a predetermined number of said uniform durations in response to said collision involving only other packets, and for scheduling retransmission of said information during (a) a first portion of said period in response to said first signal and (b) a second portion of said period in response to said second signal.

2. A contention type random access system for burst communication among a plurality of transmitter-receivers by way of a transmission path having a time delay between any transmitter and any receiver which is long compared with the duration of an information packet, so that the current status of the transmission path cannot be determined by any transmitter-receiver, the system comprising:
   a source of information to be transmitted associated with each transmitter-receiver, said information being intended for at least one other transmitter-receiver than the transmitting transmitter-receiver;
   controllable transmission means associated with each transmitter-receiver and coupled to said source of information for receiving said information to be transmitted and for one of originally transmitting and retransmitting said information over said transmission path in the form of original packets and retransmitted packets, respectively, each having a leading edge, a predetermined duration and a lagging edge;
   receiving means associated with each transmitter-receiver for receiving from said transmission path returned original packets originating from the associated transmission means, and for receiving other packets originating from transmission means associated with other transmitter-receivers, said receiving means producing idle signals when said transmission path is idle and also producing active signals when said transmission path is active;
   first timing means coupled to said receiving means and to said transmitting means and responsive to said active and idle signals for generating a first signal when said transmission path is idle for an interval preceding and contiguous with the expected time of reception of a leading edge of said returned original packet, and for generating a second signal when said tranmission path is active for an interval preceding and contiguous with said expected time of reception of said leading edge of said returned original packet and for generating a third signal when said transmission path is idle for an interval following and contiguous with said time of reception of said lagging edge of said returned original packet, and for generating a fourth signal when said transmission path is active for an interval following and contiguous with said time of reception of said lagging edge of said returned original packet and for generating a fifth signal when a packet of information having said duration is received from said other transmitter-receivers, indicating a successful transmission, and for generating a sixth signal when a packet of information having in excess of said predetermined duration is received from said other transmitter-receivers, indicating a collision; and control means coupled to said transmission means, to said receiving means and to said timing means for inhibiting said transmission means from transmitting original packets for a time equal to the duration of a predetermined number of said packets in response to said sixth signal, for causing, in response to said first and fourth signals, said transmission means to retransmit the information of said original packet as a retransmitted packet beginning at a first predetermined time following a time marker, and for causing, in response to said second and third signal, said transmission means to retransmit the information of said original transmission packet as a retransmitted packet beginning at a second predetermined time following said time marker.

3. A system according to claim 2 wherein:

said transmission means further includes memory means coupled to said source of information for storing said information to be transmitted over said transmission path by the next packet to be transmitted;

said control means is coupled to said memory means for initiating loading of new information to be transmitted into said memory in response to said first and third signals, representative of a successful transmission, and for inhibiting loading of new information into said memory means in response to one of said second and fourth signals, thereby maintaining the same information in readiness for a retransmission in response to an unsuccessful previous transmission, and readying new information for transmission in response to a successful previous transmission.

4. A system according to claim 2 wherein said time marker is the last moment of an active interval.

5. A system according to claim 2 wherein said first predetermined time is one said predetermined duration after said time marker and said second predetermined time is two said predetermined durations after said time marker.

6. A system according to claim 2 wherein said predetermined number of said packets in three.

7. A transmitter-receiver for a contention type random access system for burst communication among a plurality of like transmitter-receivers by way of a transmission path having a time delay between any transmitter and any receiver, including the associated receiver, which is long by comparison with the duration of an information packet, the transmitter-receiver comprising:

controllable transmission means coupled to said transmission path and adapted to be coupled to a source of information to be transmitted for forming said information into packets having a leading edge, a predetermined duration and a lagging edge and for one of originally transmitting said packets as original packets and retransmitting said packets as retransmission packets;

receiving means coupled to said transmission path for receiving from said transmission path returned original packets originating from said transmission means and for also receiving from said transmission path other packets originating from other transmitter-receivers in said system, for producing idle signals when said transmission path is idle and for producing active signals when said transmission path is active;

timing and logic means coupled to said transmission means and to said receiving means for generating a first signal when said transmission path is idle for an interval immediately preceding the expected time of reception of a leading edge of each returned original packet, for generating a second signal when said transmission path is active for an interval immediately preceding said expected time of reception of said leading edge of each returned original packet, for generating a third signal when said transmission path is active immediately following the expected time of receipt of a lagging edge of each said returned original packet, for generating a fourth signal when said transmission path is idle immediately following said expected time of receipt of said lagging edge of each said returned original packet, for generating a fifth signal in response to a continuous period of activity of said transmission path exceeding said predetermined duration, and for generating a timing marker at the moment said transmission path becomes idle after a period of activity; and control means coupled to said timing and logic means, to said receiving means and to said transmission means for inhibiting said transmission means from transmitting original packets for a time after said timing marker equal to the sum of one plus a first predetermined number of said predetermined durations in response to said fifth signal, for inhibiting said transmission means from transmitting for a period of one said predetermined duration following said time marker in response to one of said second and third signals, for initiating retransmission in the form of a first retransmission packet of said information contained in said returned original packet, said first retransmission packet being transmitted during a first portion of a retransmission interval extending from one said predetermined duration following said time marker until a later time in response to said first and third signals, and for initiating retransmission in the form of a second retransmission packet during a second portion of said retransmission interval in response to said first and fourth signals.

8. A transmitter-receiver according to claim 7 wherein said first portion of said retransmission interval begins one said predetermined duration following said time marker and ends two said predetermined time durations following said time marker.

9. A transmitter-receiver according to claim 8 wherein said second portion of said retransmission interval begins two said predetermined durations following said time marker and ends three said predetermined durations following said time marker.

10. A transmitter-receiver according to claim 8 wherein said first predetermined number is three.

11. A method for transmitting information among a plurality of transmitter-receivers by way of a transmission path having a time delay between any transmitter and any receiver, including the associated receiver, which is long compared with the duration of an information packet, comprising the steps of:

accepting at one or more particular transmitter-receivers information to be transmitted over said transmission path;

transmitting said information in the form of a packet of predetermined duration from each of said particular transmitter-receivers;

at each of said particular transmitter-receivers, determining whether said transmission path is idle or active immediately before the leading edge of said packet arrives and generating one of an idle-before and an active-before signal;

at said one of said particular transmitter-receivers, determining whether said transmission path is idle or active immediately after the lagging edge of said packet arrives and generating one of an idle-after and an active-after signal;

at all transmitter-receivers other than said one or more particular transmitter-receiver, generating a collision signal if said transmission path is continuously active for a period exceeding said predetermined duration;

at all transmitter-receivers, generating a time marker at the moment said transmission path becomes idle after an active period exceeding said predetermined duration;

at all transmitter-receivers other than said particular transmitter-receivers, inhibiting transmission for a period equal to three said predetermined durations after said time marker in response to said collision signal, and then reverting to normal operation;

at said particular transmitter-receivers, inhibiting transmission for at least one said predetermined duration after said time marker, in response to one of said active-before and active-after signals;

at said particular transmitter-receivers, in response to said idle-before and active-after signals, initiating retransmission of the information in said packet by way of a retransmission packet transmitted during a first portion of a retransmission interval beginning at a time one said predetermined duration after said time marker;

at said particular transmitter-receivers, in response to said active-before and idle-after signals, initiating retransmission of the information in said packet by way of a retransmission packet transmitted during a second portion of said retransmission interval.

12. A method according to claim 11 wherein said transmitting step comprises the steps of:

up-transmitting said information in the form of a packet from an Earth station to an Earth satellite transponder; and down-transmitting said information in the form of a packet from said Earth satellite transponder to all said transmitter-receivers.

13. A method according to claim 11 further comprising the steps of:

at each said particular transmitter-receiver, storing information to be retransmitted for a period of at least three predetermined time durations; and retransmitting said information to be retransmitted at a random time more than than three predetermined durations following said time marker.

14. A method according to claim 11 wherein said said first portion of said retransmission interval is a time interval extending from one said predetermined duration following said time marker until a time two said predetermined durations following said time marker.

15. A method according to claim 11 wherein said second portion of said retransmission interval excludes said first portion of said retransmission interval.

16. A method according to claim 11 wherein said retransmission interval extends from said beginning at a time one predetermined duration after said time marker until a time three said predetermined durations following said time marker.

17. A method according to claim 16 wherein said second portion of said retransmission interval extends from a time two said predetermined durations following said time marker until a time three said predetermined durations following said time marker.

18. A method for transmitting information among a plurality of transmitter-receivers by way of a transmission path having a time delay between a transmitter and any receiver, including the associated receiver, which is long by comparison with the duration of an information packet comprising the steps of:

at a first transmitter-receiver, accepting first information to be transmitted over said transmission path to all transmitter-receivers;

at a second transmitter-receiver, accepting second information to be transmitted over said transmission path to all transmitter-receivers;

transmitting during a random first interval from said first transmitter-receiver over said transmission path a first original packet having a predetermined duration and including said first information;

transmitting from said second transmitter-receiver over said transmission path a second original packet having said predetermined duration and including said second information, said second original packet being transmitted during a random second interval which one of overlaps and does not overlap said first interval, thereby defining a collision and no collision, respectively;

at all said transmitter-receivers except said first and second transmitter-receivers, receiving said first and second original packets, and establishing the presence of a collision between said first and second original packets by determining that the uninterrupted duration of said first and second original packets as received exceeds said predetermined duration, and generating a collision signal in the presence of a collision;

at all said transmitter-receivers, generating a time marker at the moment said transmission path becomes idle after a period of activity;

at all said transmitter-receivers except said first and second transmitter-receivers, inhibiting transmission for an interval extending from said time marker until a later time in response to said collision signal;

at said first transmitter-receiver, generating a first idle-before signal when said transmission path is idle immediately before the expected time of receipt of the leading edge of said first original packet, generating a first active-before signal when said transmission path is active immediately before said expected time of receipt of said leading edge of said first original packet, generating a first active-after signal when said transmission path is active immediately following the expected time of receipt of the lagging edge of said first original packet, and generating a first idle-after signal when said transmission path is idle immediately after said expected time of receipt of said lagging edge of said first original packet;

at said second transmitter-receiver, generating a second idle-before signal when said transmission path is idle immediately before the expected time of receipt of the leading edge of said second original packet, generating a second active-before signal when said transmission path is active immediately before said expected time of receipt of said leading edge of said second original packet, generating a second active-after signal when said transmission path is active immediately following the expected time of receipt of the lagging edge of said second original packet, and generating a second idle-after signal when said transmission path is idle immediately after said expected time of receipt of said lagging edge of said second original packet;

at said first transmitter-receiver, accepting further information to be transmitted over said transmission path in response to said first idle-before and first idle-after signals;

at said second transmitter-receiver, accepting further information to be transmitted over said transmission path in response to said second idle-before and second idle-after signals, whereby no retransmission occurs in the event of no overlap;

at said first transmitter-receiver, in response to said first idle-before and said first active-after signals, retransmitting said first information over said transmission path as a first retransmission packet having said predetermined duration during a first portion of said retransmission packet interval extending from one said predetermined duration following said time marker until a later time, whereby a retransmission occurs during said first portion of said retransmission interval when said first original packet is the first of packets which overlap;

at said first transmitter-receiver, in response to said first active-before and first idle-after signals, retransmitting said first information over said transmission path as a first retransmission packet having said predetermined duration during a second portion of said retransmission packet interval whereby a retransmission occurs during said second portion of said retransmission interval when said first original packet is the last of packets which overlap;

at said second transmitter-receiver, in response to said second idle-before and said second active-after signals, retransmitting said second information over said transmission path as a second retransmission packet having said predetermined duration said first portion of said retransmission packet interval, whereby a retransmission occurs during said first portion of said retransmission packet interval when said second original packet is the first of packets which overlap;

at said second transmitter-receiver, in response to said second active-before and said second idle-after signals, retransmitting said second information over said transmission path as a second retransmission packet having said predetermined duration during said second portion of said retransmission packet interval, whereby a retransmission occurs during said second portion of said retransmission packet interval when said second original packet is the last of packets which overlap.

19. A method according to claim 18 wherein said first portion of said retransmission packet interval extends from one said predetermined interval following said time marker until two said predetermined intervals following said time marker.

20. A method according to claim 18 wherein said second portion of said retransmission packet interval extends from two said predetermined intervals following said time marker until three said predetermined intervals following said time marker.

21. A method according to claim 18 wherein said later time is three said predetermined durations following said time marker.

22. A method according to claim 18 further comprising the steps of:
at said first transmitter-receiver, in response to said first active-before and said first active-after signals, retransmitting said first information over said transmission path at a random time later than the end of said retransmission packet interval, whereby if said first original packet overlaps with both said second original packet and with a third packet and is neither first nor last, said first transmitter-receiver thereafter acts on said first information as though it had not been transmitted as a first original packet.

23. A method according to claim 22 further comprising the steps of:
at said second transmitter-receiver, in response to said second active-before and said second active-after signals, retransmitting said second information over said transmission path at a random time later than said end of said retransmission packet interval, whereby if said second original packet overlaps with both said first original packet and with a third packet and is neither first nor last, said second transmitter-receiver thereafter acts on said second information as though it had not been transmitted a second original packet.

24. A contention type random access system for burst communication among a plurality of transmitter-receivers by way of a transmission path having a time delay between any transmitter and any receiver which is long by comparison with the duration of an information packet, the system comprising:

a source of information to be transmitted associated with each transmitter-receiver;

transmission means associated with each transmitter-receiver and coupled to said source of information for receiving said information to be transmitted and for one of originally transmitting encoded information over said transmission path in the form of original packets and (b) retransmitting encoded information over said transmission path in the form of retransmission packets, said packets having a leading edge, a predetermined duration, and a lagging edge;

receiving means associated with each transmitter-receiver and coupled to said transmission path for receiving from said transmission path returned original packets originating with the transmission means with which said receiving means is associated and for receiving other packets including those originating with transmission means associated with other transmitter-receivers, said receiving means producing an idle signal when said transmission path is idle, a single-use signal when said transmission path is active and information is decoded, and a collision signal when said transmission path is active and information is not decoded;

timing and logic means associated with each transmitter-receiver and coupled to said transmission means and to said receiving means for generating a first signal in response to said idle signal when said transmission path is idle immediately before the expected time of receipt of the leading edge of said returned original packet, for generating a second signal in response to said single-use signal when said transmission path is active and information is decoded immediately before said expected time of receipt of said leading edge of said returned original packet, for generating a third signal in response to said collision signal when said transmission path is active and information is not decoded immediately before said expected time of receipt of said leading edge of said returned original packet, for generating a fourth signal in response to said collision signal when said transmission path is active and information is not decoded immediately after the expected time of receipt of the lagging edge of said returned original packet, for generating a fifth signal in response to said single-use signal when said transmission path is active and information is decoded immediately after said expected time of receipt of said lagging edge of said returned original packet, for generating a sixth signal in response to said idle signal when said transmission path is idle immediately following the expected time of receipt of said lagging edge of said returned original packet, and for generating a timing marker at the moment said transmission path becomes idle after an active period;

control means associated with each of said transmitter-receivers and coupled to said timing and logic means, to said transmission means and to said receiving means for inhibiting transmission of original packets by said transmission means for a period which is the sum of one plus a predetermined number of said predetermined durations following said time marker in response to said collision signal, for initiating retransmission of information during a retransmission interval beginning one said predetermined duration following said time marker, said retransmission of information being by retransmission packets which, in response to said first and one of said fourth and fifth signals occur during a first portion of said retransmission interval, in response to said second and one of said fourth and fifth signals occur during a second portion of said retransmission interval, and in response to said sixth and one of said second and third signals occur during a third portion of said retransmission interval.

25. A system according to claim 24 wherein said predetermined number is three whereby said retransmission interval ends four said predetermined durations following said timing marker.

26. A system according to claim 24 wherein said predetermined number is four, and said control means further initiates retransmission of a fourth retransmission packet during a fourth portion of said retransmission interval in response to said fifth and one of said second and third signals.

27. A transmitter-receiver for a contention type random access system for burst communication among a plurality of like transmitter-receivers by way of a transmission path having a time delay which is long compared with the duration of an information packet, the transmitter-receiver comprising:

transmission means coupled to said transmission path and adapted to be coupled to a source of information to be transmitted for encoding said information into packets having a leading edge, a predetermined duration and a lagging edge, for originally transmitting said packets as original packets and for retransmitting said packets as retransmission packets;

receiving means coupled to said transmission path for receiving from said transmission path returned original packets originating from said transmission means and for receiving other packets including those originating with transmission means associated with other transmitter-receivers, for producing an idle signal when said transmission path is idle, for producing a single-use signal when said transmission path is active and information is decoded, and for producing a collision signal when said transmission path is active and information is not decoded;

timing and logic means coupled to said transmission means and to said receiving means for generating a first signal when said transmission path is idle immediately before the expected time of receipt of said leading edge of said returned original packet, for generating a second signal when said transmission path is active and information is decoded immediately before said expected time of receipt of said leading edge of said returned original packet, for generating a third signal when said transmission path is active and information is not decoded immediately before said expected time of receipt of said leading edge of said returned original packet, for generating a fourth signal when said transmission path is active and information is not decoded immediately after the expected time of receipt of the lagging edge of said returned original packet, for generating a fifth signal when said transmission path is active and information is decoded immediately after said expected time of receipt of said lagging edge of said returned original packet, for generating a sixth signal when said transmission path is idle immediately following the expected time of receipt of said lagging edge of said returned original packet, and for generating a timing marker at the moment said transmission path becomes idle after an active period;

control means coupled to said timing and logic means, to said transmission means and to said receiving means for inhibiting transmission of original packets by said transmission means for a period which is the sum of one plus a predetermined number of said predetermined durations following said time marker in response to any one of said third and fourth signals, and otherwise for initiating retransmission of information during a retransmission interval beginning one said predetermined duration following said time marker, said retransmission of information being by retransmission packets which, in response to said first and one of said fourth and fifth signals occur during a first portion of said retransmission interval, in response to said second and one of said and one of said fourth and fifth signals occur during a second portion of said retransmission interval, and in response to said sixth and one of said second and third signals occur during a third portion of said retransmission interval.

28. A transmitter-receiver according to claim 27 wherein said predetermined number is three whereby said retransmission interval ends four said predetermined durations following said timing marker.

29. A transmitter-receiver according to claim 27 wherein said predetermined number is four, and
    said control means further initiates retransmission of a fourth retransmission packet in response to said fifth and one of said second and third signals which occurs during a fourth portion of said retransmission interval.

30. A method for transmitting information among a plurality of transmitter-receivers by way of a transmission path having a time delay between a transmitter and any receiver, including the associated receiver, which is long compared with the duration of an information packet, comprising the steps of:
    accepting at one or more particular transmitter-receivers information to be transmitted over said transmission path to all said transmitter-receivers;
    transmitting from each of said particular transmitter-receivers said information in the form of an original packet of predetermined duration bearing said information in encoded form;
    determining at said particular transmitter-receivers if said transmission path is idle immediately before receipt of the leading edge of its own packet from said transmission path, and generating in response an idle-before signal;
    determining at said particular transmitter-receivers if said transmission path is active during an interval immediately before receipt of the leading edge of said own packet from said transmission path, and generating in response an active-before signal;
    determining at said particular transmitter-receivers in response to said active-before signal whether, in said interval immediately before receipt of said leading edge of said own packet, information can be correctly decoded, and in response to correct decoding generating a single-use-before signal;
    determining at said particular transmitter-receivers if said transmission path is idle immediately after receipt of the lagging edge of said own packet and generating in response an idle-after signal;
    determining at said particular transmitted-receivers if said transmission path is active immediately after receipt of said lagging edge of said own packet and in response generating an active-after signal;
    at all said transmitter-receivers establishing the presence or absence of a collision in a currently received packet;
    generating a time marker at the moment said transmission path becomes idle after an active period;
    establishing a retransmission packet interval which begins one said predetermined duration after said time marker and extends continuously for a predetermined number of said predetermined durations, said predetermined number being equal to the maximum number of retransmission packets to be transmitted in one contiguous burst;
    retransmitting as a first retransmission packet that information in said original packet during said retransmission packet interval, said first retransmission packet being transmitted during a first portion of said retransmission packet interval in response to said idle-before and said active-after signals;
    retransmitting as a second retransmission packet that information in said original packet during said retransmission packet interval, said second retransmission packet being transmitted during a second portion of said retransmission packet interval not used for transmission of said first retransmission packet in response to said single-use-before signal and said active-after signal;
    retransmitting as a third retransmitted packet that information in said original packet during said retransmission packet interval, said third retransmission packet being transmitted during a third portion of said retransmission packet interval not used for transmission by either of said first and second retransmission packets in response to said active-before and idle-after signals;
    at all said transmitter-receivers other than said particular transmitter-receivers, inhibiting transmission from said time marker until the end of said retransmission packet interval.

31. A method according to claim 30, wherein said retransmission packet interval extends from a time one said predetermined duration following said time marker until a time four said predetermined durations following said time marker.

32. A method according to claim 30, wherein said first portion of said retransmission interval begins one said predetermined duration following said time marker and ends two said predetermined durations following said time marker, said second portion of said retransmission interval begins two said predetermined durations after said time marker and ends three said predetermined durations following said time marker, and said third portion of said retransmission interval begins three said predetermined durations after said time marker and ends four said predetermined durations following said time marker.

33. A method according to claim 31 further comprising the steps of:
    noting at said particular transmitter-receivers in response to said active-after signal whether, in said interval immediately following receipt of said lagging edge of said own packet, information can be correctly decoded, and in response generating a single-use-after signal;
    at all said transmitter-receivers other than said particular transmitter-receivers, inhibiting transmission for a further period of time extending from four to five said predetermined time intervals following said time marker; and
    retransmitting as a retransmitted packet that information in said original packet during said retransmission packet interval at a time not used for retransmission of one of said first, second and third retransmission packets, in response to said single-use-after signal.

34. A method for transmitting information among a plurality of transmitter-receivers by way of a transmission path having a time delay between a transmitter and any receiver, including the associated receiver, which is long compared with the duration of an information packet, comprising the steps of:
    accepting at one or more particular transmitter-receivers information to be transmitted over said transmission path to all said transmitter-receivers;
    transmitting from each of said particular transmitter-receivers said information in the form of an original packet of predetermined duration bearing said information in encoded form;

determining at said particular transmitter-receivers if said transmission path is idle immediately before the receipt of the leading edge of its own packet from said transmission path, and generating in response an idle-before signal;

determining at said particular transmitter-receivers if said transmission path is active during an interval immediately before receipt of the leading edge of said packet from said transmission path, and generating in response an active-before signal;

determining at said particular transmitter-receivers if said transmission path is idle immediately after receipt of the lagging edge of said own packet and generating in response an idle-after signal;

determining at said particular transmitted-receivers if said transmission path is active immediately after receipt of said lagging edge of said own packet and generating in response an idle-after signal;

determining at said particular transmitter-receivers in response to said active-after signal whether, in said interval immediately after receipt of said lagging edge of said own packet, information can be correctly decoded, and in response to correct decoding generating a single-use-after signal;

at all said transmitter-receivers establishing the presence or absence of a collision in a currently received packet;

generating a time marker at the moment said transmission path becomes idle after an active period;

retransmitting as a first retransmission packet that information in said original packet during a retransmission packet interval which begins one said predetermined duration after said time marker and extends continuously for a predetermined number of said predetermined durations, said first retransmission packet being transmitted during a first portion of said retransmission packet interval in response to said idle-before and said active-after signals, said predetermined number being equal to the number of retransmission packets to be transmitted in one contiguous burst;

retransmitting as a second retransmission packet that information in said original packet during said retransmission packet interval, said second retransmission packet being transmitted during a second portion of said retransmission packet interval at a time not used for transmission of said first retransmission packet in response to said active-before and single-use-after signals;

retransmitting as a third retransmitted packet that information in said original packet during said retransmission packet interval, said third retransmission packet being transmitted during a third portion of said retransmission packet interval at a time not used for transmission by one of said first and second retransmission packets in response to said active-before and idle-after signals;

at all transmitter-receivers other than said particular transmitter-receivers, inhibiting transmission from said time marker until the end of said retransmission packet interval.

35. A contention type random access system for burst communication among a plurality of transmitter-receivers by way of a transmission path having a time delay between any transmitter and any receiver which is long compared with the duration of an information packet, so that the current status of the sending end of said transmission path cannot be determined by any transmitter-receiver, the system comprising:

a source of information to be transmitted associated with each transmitter-receiver, said information being intended for at least one transmitter-receiver other than the local transmitter-receiver with which said source of information to be transmitted is associated;

controllable transmission means associated with each transmitter-receiver, and coupled to said source of information to be transmitted for receiving said information to be transmitted, for encoding said information to be transmitted and for one of originally transmitting and retransmitting said information over said transmission path in the form of one of original packets and retransmission packets, respectively, said packets having a leading edge, a predetermined duration and a lagging edge;

receiving means associated with each transmitter-receiver for receiving from said transmission path received signals representing returned packets originating from the local transmitter-receiver with which said receiving means is associated and also for receiving signals representing packets originating from other transmitter-receivers, for producing an idle signal during those times in which said receiving means receives no signal from said transmission path, for decoding said signals representing packets to form reconstituted information during those non-collision intervals in which but a single signal is received from said transmission path, and for producing a collision signal during those times in which said received signals are not decoded thereby indicating a collision;

round-trip time means associated with each transmitter-receiver for generating signals representative of the round-trip time delay between the transmitter and the receiver of a transmitter-receiver by way of said transmission path;

timing and logic means associated with each transmitter-receiver and coupled to said transmitting means, to said receiving means and to said round-trip time means for generating a first signal when said transmission path is idle during an interval preceding and contiguous with the expected time of reception of a leading edge of a returned packet, for generating a second signal when said receiver generates reconstituted information during an interval preceding and contiguous with the time of reception of a leading edge of a returned packet, for generating a third signal when said receiver fails to decode signals received during a period preceding and contiguous with the time of reception of a leading edge of a returned packet, for generating a fourth signal when said receiver fails to decode signals received during an interval following and contiguous with the lagging edge of a returned packet, for generating a fifth signal when said receiver generates reconstituted information for an interval following and contiguous with said lagging edge of a returned packet, and for generating a sixth signal when said transmission path is idle for a period immediately following and contiguous with said lagging edge of a returned packet, and for generating a timing marker at the moment said transmission path becomes idle after a period of activity; and control means associated with each transmitter-receiver and coupled to said transmission means, to said receiving means and to said timing and logic means for identifying collision with said returned packet whereby an effective failure to transmit said information is indicated, and in response thereto inhibiting said transmission means for a predetermined interval following receipt of said idle signal from said receiving means, and thereafter enabling said transmission means for retransmission of the same information indicated as failed to transmit by means of a retransmission packet transmitted beginning at a time which is one predetermined duration after said timing marker in response to said first and one of said fourth and fifth signals, two predetermined durations after said timing marker in response to said second and one of said fourth and fifth signals, three predetermined durations after said timing maker in response to said fifth and one of said second and third signals, and four predetermined durations after said timing marker in response to said sixth and one of said second and third signals.

\* \* \* \* \*